(12) United States Patent
Makino

(10) Patent No.: US 6,525,587 B2
(45) Date of Patent: Feb. 25, 2003

(54) SEMICONDUCTOR INTEGRATED CIRCUIT DEVICE INCLUDING A CLOCK SYNCHRONOUS TYPE LOGICAL PROCESSING CIRCUIT

(75) Inventor: Hiroshi Makino, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/086,874

(22) Filed: Mar. 4, 2002

(65) Prior Publication Data

US 2002/0149405 A1 Oct. 17, 2002

(30) Foreign Application Priority Data

Apr. 11, 2001 (JP) ........................................ 2001-112832

(51) Int. Cl.[7] .............................................. H03K 3/013
(52) U.S. Cl. ........................................ 327/292; 327/143
(58) Field of Search ................................ 327/141, 143, 327/176, 208, 210–212, 225, 291–294, 299; 716/6, 18

(56) References Cited

U.S. PATENT DOCUMENTS 5,742,190 A * 4/1998 Banik et al. ................ 327/152
6,184,813 B1 * 2/2001 Abughazaleh et al. ...... 341/144
6,457,161 B1 * 9/2002 Nadeau-Dostie et al. ...... 716/6

FOREIGN PATENT DOCUMENTS

| JP | 3-131035 | 6/1991 |
| JP | 10-189884 | 7/1998 |
| JP | 11-260055 | 9/1999 |

OTHER PUBLICATIONS

"A 0.9V 150 MHz 10m W 4 m m$^2$ 2–D Discrete Cosine Transform Core Processor with Variable–Threshold–Voltage Scheme", T. Kuroda et al., 1996 IEEE International Solid-State Circuits Conference, Feb. 9, 1996, pp. 166–167.

"A 18μA–Standby–Current 1.8V 200 MHz Microprocessor with Self Substrate–Biased Data–Retention Mode", H. Mizuno et al., 1999 IEEE International Solid–State Circuits Conference, Feb., 1999, pp. 280–281.

* cited by examiner

Primary Examiner—My-Trang Nu Ton
(74) Attorney, Agent, or Firm—McDermott, Will & Emery

(57) ABSTRACT

A first circuit group for generating a dock signal, and a second circuit group for carrying out a transferring operation and a logical processing operation on a signal in accordance with this clock signal are arranged, and operation voltage sources of these circuit groups are made individually settable. Thus, the operation speeds of the first circuit group and the second circuit group are individually adjusted so as to eliminate a problem of an erroneous operation due to a racing through an operation. An erroneous operation due to a racing caused by dock skew can be reliably prevented through an external operation.

24 Claims, 16 Drawing Sheets

SEMICONDUCTOR INTEGRATED CIRCUIT DEVICE INCLUDING A CLOCK SYNCHRONOUS TYPE LOGICAL PROCESSING CIRCUIT

BACKGROUND OF THE INVENTION

1. Field of the Invention

The present invention relates to a semiconductor integrated circuit, and, more particularly, to a semiconductor integrated circuit containing a logical processing circuit that is operated to process data in accordance with a distributed clock signal from a clock distribution circuit.

2. Description of the Background Art

FIG. 18 is a diagram schematically showing the entire construction of a conventional integrated circuit (LSI) chip (integrated circuit device). In FIG. 18, the LSI chip (semiconductor integrated circuit device) LC includes an analog core circuit AK for processing an analog signal, a digital core circuit DCR for processing a digital signal and an input/output circuit IOK for transmitting and receiving data between the digital core circuit DCR and an external device. Analog core circuit AK includes, for example, a digital/analog conversion circuit and an analog/digital conversion circuit, and externally transmits and receives an analog signal, such as an output signal from a sensor or an image signal.

Digital core circuit DCR includes an internal clock generation circuit CKK for generating an internal clock signal CLKi in accordance with a clock signal CLKe externally supplied, and a digital processing circuit DK for performing a signal processing in a pipeline manner in synchronization with internal clock signal CLKi from internal clock generation circuit CKK. This digital processing circuit DK processes a signal supplied from input/output circuit IOK or analog core circuit AK, and applies the result of processing to the input/output circuit IOK or analog core circuit AK.

Digital processing circuit DK is operated synchronously with internal clock signal CLKi from internal clock generation circuit CKK. In order to operate digital processing circuit DK accurately at high speeds, it is required that internal clock signal CLKi should be transmitted to the respective circuits of digital processing circuit DK at the same phase so that the internal circuits of digital processing circuit DK are operated at the same tiring. In particular, as the scale of the digital processing circuit becomes larger, the interconnection length of the clock signal transfer line becomes longer, and therefore, it is necessary to transmit the internal clock signal to the respective internal circuits without an influence due to a signal propagation delay through the clock signal transfer line.

FIG. 19 is a schematic diagram showing an example of the construction of a conventional digital processing circuit (hereinafter, referred to as a semiconductor integrated circuit). In FIG. 19, the semiconductor integrated circuit (DCR) 1 includes a clock buffer 2 for distributing an internal clock signal supplied to an internal clock node 6 to the various parts of the semiconductor integrated circuit, and a logical circuit group RG for carrying out logical processes in synchronization with the internal clock signal from this clock buffer 2. In FIG. 19, one logical circuit 5, included in the logical circuit group RG, is representatively shown.

Latch circuits 3 and 4, which complementarily enter through and latch states in synchronization with the internal clock signal that is applied through clock nodes 7 and 8 from dock buffer 2, are provided in logical circuit 5. Latch circuit 3 is set to the through state when the internal clock signal applied from clock buffer 2 to clock node 7 goes high, thereby transmitting a signal applied to a data node 9 to logical circuit 5 through a data node 10. Latch circuit 3 is set to the latch state when the internal clock signal on clock node 7 goes low, thereby isolating data nodes 9 and 10 from each other.

Latch circuit 4 is set to the through state when the internal clock signal on clock node 8 goes low, thereby transmitting the logical processing signal applied to data node 11 from logical circuit 5 to data node 12. Latch circuit 4 is set to the latch state when the internal clock signal on clock node 8 goes high, thereby isolating data nodes 11 and 12 from each other.

Clock buffer 2 may be an internal clock generation circuit CKK shown in FIG. 18, or may carry out a buffering on an internal clock signal from internal clock generation circuit CKK for distributing the resultant clock signal to the logical circuit group RG corresponding to digital processing circuit DK.

Semiconductor integrated circuit 1 is constituted by MOS transistors (insulated gate type field effect transistors). The source node of a P-channel MOS transistor of semiconductor integrated circuit 1 is supplied with a power supply voltage Vdd as a one operating power supply voltage from power supply node 17 through a common source node 13. Here, the back gate (substrate area) of the P-channel MOS transistor is supplied with power supply voltage Vdd through a common substrate node 14.

The source of an N-channel MOS transistor that is a component thereof is supplied with a ground voltage (GND; Vss) on a ground node 18 through a common source node 15, and the back gate (substrate area) of this N-channel MOS transistor is also supplied with the ground voltage of ground node 18 through a common substrate node 16.

Semiconductor integrated circuit 1 is operated by using both of power supply voltage Vdd of power supply node 17 and the ground voltage (GND) of ground node 18 as operating power supply voltages. Now, a description will be briefly made of the operation of the circuit device.

The clock signal, applied through clock node 6, is distributed to the each part of semiconductor integrated circuit 1 by clock buffer 2, and applied to each latch (transfer) circuits such as latch circuits 3 and 4 contained in the logical circuit group RG. Clock buffer 2, the structure of which will be described later, carries out a buffering on the clock signal and distributes the resultant clock signal such that the propagation delay of the internal clock signal becomes the same in the respective internal parts of integrated circuit 1.

Latch circuit 3 is set to the through state when the internal clock signal of dock node 7 goes high (logical High level), thereby transmitting the signal on data node 9 to data node 10. Latch circuit 3 also isolates data node 9 from data node 10 when the internal clock signal on clock node 7 goes low (logical Low level). Thus, latch circuit 3 has a function of holding the state immediately before the internal clock signal on clock node 7 changes from the High level to the Low level.

Logical circuit 5 carries out a predetermined logical process on the signal received through latch circuit 3, and outputs a signal representing the result of process to data node 11.

Latch circuit 4 is set to the through state when the internal clock signal, applied from dock buffer 2 to dock node 8, goes low, thereby transmitting the signal applied on the data node 11 to data node 12. Latch circuit 4 is also set to the latch state when the internal clock signal on clock node 8 goes high, thereby electrically separating data node 11 and data node 12.

In other words, when latch circuit 3 is in the through state while latch circuit 4 is in the latch state, logical circuit 5 carries out a logical operation. When the internal dock signals of clock nodes 7 and 8 change to the Low level, latch circuit 3 is set to the latch state to hold data node 10 at the signal state immediately before the change. Thus, there is no change in the logical operation of logical circuit 5, and the result of logical process appearing on data node 11 is transferred to data node 12 on the subsequent stage. The signal of data node 12 serves as an input signal to a logical circuit or other on a subsequent stage.

One pipeline stage is formed by latch circuits 3 and 4, and each stage carries out a logical process in synchronization with the internal clock signal from clock buffer 2. In the logical circuit group RG, signals are successively transferred through the latch circuits in accordance with the internal clock signal so that the so-called pipeline process, in which data is successively transferred in accordance with the internal dock signal, is achieved.

FIG. 20 is a diagram showing an example of the construction of a logical circuit 5 shown in FIG. 19. In FIG. 20, the structure of a CMOS inverter with one input and one output is shown as logical circuit 5. In FIG. 20, logical circuit 5 includes a P-channel MOS transistor 21 and an N-channel MOS transistor 22. P-channel MOS transistor 21 has a source connected to a source node 25, a back gate connected to a substrate node 26, a gate connected to a common node (input node) 23 and a drain connected to a common drain node (output node) 24. N-channel MOS transistor 22 has a gate connected to common gate node 23, a drain connected to common drain node 24, a source connected to a source node 27 and a back gate connected to a substrate node 28.

Source node 25 and substrate node 26 are connected to common source node 13 and common substrate node. 14 shown in FIG. 19, respectively, and power supply voltage Vdd is supplied to the source and the back gate of P-channel MOS transistor 21. Source node 27 and substrate node 28 are coupled to common source node 15 and common substrate node 16 shown in FIG. 19, respectively, and this N-channel MOS transistor 22 receives the ground voltage (Vss) at the source and back gate thereof.

In logical circuit 5 shown in FIG. 20, an input signal IN on common gate node 23 goes low, the source and drain of P-channel MOS transistor 21 are allowed to be coupled, while the source and drain of N-channel MOS transistor 22 are not allowed to be coupled. Therefore, common drain node (output node) 24 is set to the High level at the voltage level determined by the potential of source node 25 by P-channel MOS transistor 21. Source node 25 is connected to power supply node 17 shown in FIG. 19, and therefore, the High level of this output signal OUT is at the level of power supply voltage Vdd.

Referring to FIG. 21, a description will be made of a case in which input signal IN of common gate node 23 changes from the Low level to the High level. It is assumed that the threshold voltage of P-channel MOS transistor 21 is Vthp and that the threshold voltage of N-channel MOS transistor 22 is Vthn. Here, the threshold voltage represents a voltage Vgs applied between the gate and the source when the electrical state between the source and the drain change from the non-conductive state to the conductive state in changing the gate to source voltage in an MOS transistor. The threshold voltage is normally set by adjusting the concentration of impurities in the channel region by adjusting the ion implantation condition in a manufacturing process for forming an MOS transistor, in accordance with conditions such as a power supply voltage.

As represented in FIG. 21, when input signal IN is raised from the Low level so that the voltage between gate 23 and source 27 of N-channel MOS transistor exceeds threshold voltage Vthn, the source and drain of N-channel MOS transistor 22 are allowed to be electrically coupled, thereby starting the voltage of output node 24 to drop.

When the voltage of input node 23 is further raised so that voltage Vgs between gate 23 and source 25 of P-channel MOS transistor 21 becomes smaller than the absolute value of threshold voltage Vthp (higher than the threshold voltage Vthp), P-channel MOS transistor 21 is set to the non-conductive state between the source and drain thereof. Consequently, no charge is supplied to output node 24 from the power supply, and the voltage of output node 24 is set to the Low level at a level determined by the voltage of a source node 27. This source node 27 is connected to ground node 18 in FIG. 19, and the Low level of output signal OUT is set to the level of ground voltage GND. Therefore, when the voltage of input node 23 is at the High level, the voltage of output node 24 is fixed to the ground voltage level.

Next, a description will be given of a case in which the input signal of input node 23 changes from the High level to the Low level. When the voltage on input node 23 lowers from the High level and the voltage Vgs between gate 23 and source 25 of P-channel MOS transistor 21 exceeds threshold voltage Vthp, the source and drain of P-channel MOS transistor 21 are allowed to be electrically coupled to each other, thereby starting the voltage level of output node 24 to rise. The voltage on input node 23 further lowers and the voltage between gate 23 and source 27 of N-channel MOS transistor 22 becomes lower than threshold voltage Vthn, the source and drain of N-channel MOS transistor 22 is set to the electrically non-coupled state. Consequently, at output node 24, no charge is allowed to flow to the ground node, and the voltage of output node 24 is set to the High level at a level determined by the voltage level of source node 25, that is, the level of power supply voltage Vdd.

As shown in FIG. 20, the inverter circuit outputs an inverted signal of input signal IN of input node 23 to output node 24. In general, logical circuit 5 is a circuit with multiple inputs and one output, and receives, in parallel, transfer signals from a plurality of latch circuits 3 depending on its construction. However, the basic construction of logical circuit 5 is a CMOS inverter as shown in FIG. 20, and charging or discharging of an output node is carried out in accordance with the threshold voltage of the MOS transistor of a component and the voltage level of the input signal, to finally determine the voltage level of the output signal.

FIG. 22 is a schematic diagram showing an example of the construction of a clock buffer 2 shown in FIG. 19. In FIG. 22, clock buffer 2 includes a first stage inverter 32a that receives an internal clock signal (or an external clock signal) applied to clock node 6, second stage inverters 32b that are connected in parallel with each other and receive an output signal of first stage inverter 32a, and final stage inverters 32na–32nz that are connected in parallel with each other. Clock signals are transmitted to respective latch circuits of logical circuit group RG through inverters 32a, 32b. . . 32an–32az that are placed in a tree-like shape. This tree-like arrangement of the inverters provides the same propagation delay of the clock signal of the clock distribution paths in dock buffer 2, thereby making it possible to provide the same propagation delay of the clock signals outputted by final stage inverters 32na–32nz. Moreover, inverters 32a–32nz enables a high speed transmission of the clock signal in each dock distribution path.

Internal clock signals from these final stage inverters 32na–32nz are applied, as operation timing signals, to latch groups 33a–33z that are placed in various parts of semiconductor integrated circuit 1 in a distributed manner. Each of inverters 32a, 32b, . . . 32na–32nz has the construction of a CMOS inverter as shown in FIG. 20.

Each of latch groups 33a–33z includes one or more latch circuits. The output signals of the one or more latch circuits are applied to the corresponding logical circuits to carry out a.logical process. Moreover, the output signal of a logical circuit is applied to the one or more latch circuits. The correlation between latch groups 33a–33z and logical circuit groups placed correspondingly is appropriately determined in accordance with the contents of a logical process to be carried out.

FIG. 23 is a diagram showing another construction of clock buffer 2 shown in FIG. 19. In the construction shown in FIG. 23, there is provided a PLL (phase locked loop) circuit 34, for synchronizing and locking the phase of a clock signal applied to clock input node 6 with an internal clock signal applied to a feed back node 35 from final stage inverter 32nz. The output clock signal of PLL circuit 34 is applied to final stage inverter 32a of clock buffer 2. The PLL circuit 34 may be placed corresponding to internal clock generation circuit CKK shown in FIG. 18, or internal clock generation circuit CKK shown in FIG. 18 may include this PLL circuit 34 and clock buffer 2.

In the construction shown in FIG. 23, it is intended to lock the phase of the clock signal applied to clock input node 6 to the internal clock signals applied to respective latch groups 33a–33z. The propagation delay of the clock tree (inverters placed in a tree-like shape) in clock buffer 2 is the same in each signal transmission path. Even when a propagation delay occurs, PLL circuit 34 compensates for the propagation delay and applies a clock signal being in phase with the clock signal applied to clock input node 6 to latch groups 33a–33z.

FIG. 24 is a diagram showing an example of the construction of latch circuit 3 shown in FIG. 19. In FIG. 24, latch circuit 3 includes an inverter 45 that inverts clock signal CK applied to a clock input node 51 and transmits the resultant signal to a node 57, a CMOS transmission gate CM1 that is rendered conductive in response to the signals on clock input node 51 and internal node 57 and electrically connects a node 52 and a node 53 when made conductive, a CMOS transmission gate CM2 that is rendered conductive complementarily to CMOS transmitter gate CM1 in response to the complementary clock signals on node 51 and node 57, for electrically connecting node 56 and node 53, an inverter 46 that inverts a signal on node 53 and transmits the resultant signal to a node 54, an inverter 47 that inverts the signal on node 54 and transmits the resultant signal to CMOS transmission gate CM2 through node 56, and an inverter 48 that inverts the signal on node 54 and transmits the resultant signal to an output node 55. Output data DO is outputted from output node 55, and transmitted to a corresponding logical circuit.

CMOS transmission gate CM1 includes an N-channel MOS transistor 41 that is rendered conductive, when clock signal CK on clock node 51 is at the High level, to electrically connect node 52 and node 53, and a P-channel MOS transistor 42 that is rendered conductive, when the signal on internal node 57 is at the Low level, to electrically connect node 52 and node 53. A back gate 58 of MOS transistor 41 is connected to common substrate node 16 shown in FIG. 19 and receives a ground voltage. A back gate of MOS transistor 42 is coupled to common substrate node 14 shown in FIG. 19 so as to receive power supply voltage Vdd. These MOS transistors 41 and 42 are set to conductive/non-conductive state in the same phase.

CMOS transmission gate CM2 includes a P-channel MOS transistor 43 that is rendered conductive, when internal dock signal CK on dock node 51 is at the Low level, to electrically connect node 53 and node 56, and an N-channel MOS transistor 44 that is rendered conductive, when the signal w on node 57 is at the High level, to electrically connect node 56 and node 53. A back gate 60 of P-channel MOS transistor 43 is connected to common substrate node 14 shown in FIG. 19 to receive power supply voltage Vdd. A back gate 61 of N-channel MOS transistor 44 is connected to common substrate node 16 shown in FIG. 19 to receive ground voltage GND.

Each of inverters 45-48 has the construction of a CMOS inverter shown in the aforementioned FIG. 20.

When clock signal CK on clock node 51 is at the High level, the voltage of internal node 57 is set to the Low level by inverter 45, making both of MOS transistors 41 and 42 conductive so that data DI applied on node 52 is transmitted to node 53. When clock signal CK is at the Low level, the voltage of node 57 is set to the High level, making both of MOS transistors 41 and 42 non-conductive so that node 52 and node 53 are electrically separated to block the transmission of data DI.

Moreover, as for CMOS transmission gate CM2, when clock signal CK is at the Low level, P-channel MOS transistor 43 and N-channel MOS transistor 44 are rendered conductive to transmit the signal on node 56 to node 53. In the case when clock signal CK is at the High level, since node 57 is set to the Low level so that both MOS transistors 43 and 44 become non-conductive, thereby blocking data transmission from inverter 47 to node 56.

In other word, when clock signal CK is at the High level, transmission gate CM1 is rendered conductive, while transmission gate CM2 is made non-conductive. Thus, data DI, applied through node 52, is transmitted.to internal node 53, and inverted by inverters 46 and 48 so that data having the same logical level as input data DI is outputted from output node 55.

When clock signal CK is at the Low level, CMOS transmission gate CM1 is made non-conductive, while CMOS transmission gate CM2 is made conductive, thereby blocking the transmission of data DI to node 52, while transmitting the output signal of inverter 47 to node 53. Therefore, inverters 46 and 47 have a construction equivalent to a construction of a ring-like connection, to form an inverter latch. Thus, data immediately before clock signal CK falls to the Low level is held on nodes 53 and 54. In other words, the operation of latch circuit 3 shown in the aforementioned FIG. 19 is achieved.

FIG. 25 is a diagram showing an example of the construction of latch circuit 4 shown in FIG. 19. In this construction shown in FIG. 25, the position of inverter 45 is different from that in latch circuit 3 shown in FIG. 24. Specifically, the output signal of inverter 45a for inverting clock signal CK on clock node 51 is supplied to the gates of N-channel MOS transistor 41 and P-channel MOS transistor 43. Clock signal CK is supplied to the gates of MOS transistors 42 and 44. The other arrangement of the circuitry shown in FIG. 25 is the same as that of latch circuit 3 shown in FIG. 24, and therefore, the corresponding parts are indicated by the same reference numerals, and the detailed explanation thereof is omitted.

In the latch circuit having the construction of FIG. 25, the phase of clock signal applied to CMOS transmission gates CM1 and CM2 is inverted relative to that of latch circuit 3 shown in FIG. 24. Therefore, when clock signal CK is at the High level, CMOS transmission gate CM1 is made non-conductive, while CMOS transmission gate CM2 is rendered conductive, and latch circuit 4 is set to the latch state. When clock signal CK is at the Low level, CMOS transmission gate CM1 is rendered conductive, while CMOS transmission gate CM2 is made non-conductive, and latch circuit 4 is set to the through state so that data output signal DO is set to a state corresponding to input data signal DI.

Therefore, latch circuit 4 is set to the through state and to the latch state complementarily to latch circuit 3 shown in FIG. 24, and it is possible to achieve the operation of latch circuit 4 shown in FIG. 19.

In this manner, by forming a single pipeline stage using latch circuits that conduct complementarily with each other, processing and transferring of signal/data are carried out in synchronization with clock signals in respective stages so that it becomes possible to execute a logical process in a pipeline manner. Moreover, by supplying clock signals equal in the phase to latch circuits 3 and 4 through clock buffers as shown in FIG. 22 or 23, it is possible to carry out capturing and transferring of signals at the same timing at the individual stages.

Here, a clock signal, inputted to semiconductor integrated circuit 1, is distributed to latch groups 33a–33z through the clock buffer as shown in FIG. 22 or FIG. 23. The changes in the clock signal to latch groups 33a–33z need to take place at the same time. For this reason, clock buffer 2 is constituted by clock drivers (inverters) that are arranged in a tree-like shape. However, in an actual process, due to differences in the interconnection-length and interconnection load, a slight offset (variation) occurs in the input timing of the clock signal in each of latch groups 33a–33z. This offset in the timing (phase) in the clock signal is so-called clock skew, and due to this clock skew, an offset occurs in operation timing in each of the groups of latch circuits.

Referring to FIG. 26A, a description will be given of the case in which clock signals reach clock input nodes 7 and 8 shown in FIG. 19 at the same phase. In this case, with respect to node 10, latch circuit 3 is set to the through state in response to a rise of the clock signal of clock node 7, the signal of data node 10 changes in response to the signal on the data node 9. At this time, since the clock signal of clock node 8 is at the High level, latch circuit 4 is set to the latch state, and the signal on the data node 12 does not change. The signal on data node 11 changes after a lapse of a propagation delay time Td through the logical processing of logical circuit 5.

However, if the propagation delay time Td is shorter than the High level period of the clock signal on clock node 8, latch circuit 4 is in the latch state, and during the High level of the clock signal, the signal of data node 12 does not change. Next, when the clock signals falls to the Low level at nodes 7 and 8, latch circuit 3 is set to the latch state while latch circuit 4 is set to the through state. Thus, the signal state of node 12 changes in accordance with data signal DO transmitted from logical circuit 5 to node 11 so that data DO is transmitted. Therefore, when the clock signal of clock node 8 falls to the Low level, the result of processing in the logical circuit is accurately transmitted to data node 12.

Now, referring to FIG. 26B, a description will be given of the case in which the clock signal reaches clock node 7 earlier relative to clock node 8 by time δ. In the case where this clock skew δ is greater than propagation delay time Td of the signal from data node 10 to data node 11, when the signal on node 11 changes in accordance with the result of processing in the logical circuit, the signal on node 12 can change in accordance with the processing result, since the clock signal on clock node is still at the Low level, and latch circuit 4 is in the through state. In other words, both of latch circuits 3 and 4 are set to the through level so that the data signal of node 11 is transmitted to node 12 immediately. When the latch circuit 4 enters the latch state in response to the High level of the clock signal of clock node 8, a signal that was changed in the previous cycle is outputted. Therefore, data is transmitted to the circuit on the next stage from the latch circuit 4 a half-cycle earlier. In this case, in the next stage circuit, when the input latch circuit is operated complementarily with latch circuit 4, the input latch circuit is set to the through state, and therefore, the circuit on the next stage carries out a process in accordance with data to be supplied in the next cycle, causing an erroneous operation.

Such a data penetrating phenomenon due to a clock skew is generally referred to as "racing". Once a racing occurs, it is not possible to dissolve the racing even if the clock period is changed since this racing is caused by skew δ in the delay time in the clock distribution (the time δ of the clock skew is constant, and the propagation delay time Td is also constant). Moreover, even if the operation speed in the entire semiconductor integrated circuit 1 is changed by changing the level of the power supply voltage, since the operation speeds of the clock buffer, the latch circuit.and the logical circuit are changed in the same manner, the propagation delay times of the clock signal and data are merely changed, without any change in the relative relationship between skew δ of the clock signal and signal propagation delay Td, and therefore, it is not possible to solve the problem of racing due to the clock skew.

Therefore, once a racing occurs, it causes a failure that cannot be controlled externally. In order to prevent the occurrence of such a "racing", a conventional method inserts a delay circuit having a delay time of not less than clock skew δ to each of logical circuits 5 within the semiconductor integrated circuit. In this case, the sum of the propagation delay time Td and the delay time Δ of this delay circuit becomes greater than the clock skew δ, thereby making it possible to prevent the occurrence of a racing. However, when the delay time of the delay circuit is made greater so as to provide a sufficient operating margin, a signal propagation delay time in one stage (between latch circuits 3 and 4 that are complementarily operated) becomes greater, and a high-speed operation could not be achieved and the circuit scale is also increased, resulting in increased production cost.

SUMMARY OF THE INVENTION

It is an object of the present invention to provide a semiconductor integrated circuit device that can reliably prevent an erroneous operation due to the clock skew.

Another object of the present invention is to provide a semiconductor circuit device that can control an erroneous operation due to data racing caused by clock skew externally.

A semiconductor integrated circuit in accordance with the first aspect of the present invention includes: clock distribution circuitry that receives a first operating voltage and distributes a clock signal with its operation speed determined by the received first operation voltage and includes insulated gate type transistors receiving the first operation voltage at their respective first conduction nodes; a plurality of latch circuits each for transferring a signal applied thereto in accordance with the clock signal from the clock distribution circuit; and at least one logical circuit that is placed corresponding to the plurality of latch circuits and that carries out a logical process on a signal from a corresponding latch circuit to output a resultant signal.

The logical circuit includes insulated gate type transistors, of the same conductivity type as the transistors of the clock distribution circuitry, receiving a second operation voltage at their respective first conduction nodes and has the operation speed determined by the received second operating voltage.

The first and second operation voltages have their voltage levels settable individually.

A semiconductor integrated circuit in accordance with a second aspect includes: clock distribution circuitry that receives a first operating voltage and distributes a clock signal with its operation speed determined by the received first operation voltage and includes insulated gate type transistors receiving the first operation voltage at their respective back gates; a plurality of latch circuits each for transferring a signal applied thereto in accordance with the clock signal from the clock distribution circuit; and at least one logical circuit that is placed corresponding to the plurality of latch circuits and that carries out a logical process on a signal from a corresponding latch circuit to output a resultant signal.

The logical circuit includes insulated gate type transistors, of the same conductivity type as the transistors of the clock distribution circuitry, receiving a second operation voltage at their respective back gates and has the operation speed determined by the received second operating voltage.

A semiconductor integrated circuit in accordance with a third aspect of the present invention includes: clock distribution circuitry for distributing a clock signal; a plurality of transfer circuits operating in accordance with the clock signals from the clock distribution circuit, each for transferring a signal applied thereto in accordance with the dock signal thus distributed; at least one logical circuit placed corresponding to the plurality of transfer circuits, for carrying out a logical process on a signal from a corresponding transfer circuit to output a resultant signal; and an operation speed adjusting circuit for individually adjusting the operation speeds of the dock distribution circuit and the logical circuit.

A semiconductor integrated circuit in accordance with a fourth aspect of the present invention includes: clock distribution circuitry receiving a first operation voltage and having an operation speed determined in accordance with the first operation voltage, for distributing a clock signal; a plurality of latch circuits for transferring received signals in accordance with clock signals received from the clock distribution circuitry; and at least one logic circuit arranged corresponding to the plurality of latch circuits and receiving a second operation voltage other than the first operation voltage and having an operation speed thereof determined in accordance with the second operation voltage, for carrying a logical process on a signal received from a corresponding latch circuit to output a resultant signal.

The first and second operation voltages are applied to the clock distribution circuitry and the logic circuit separately and dedicatedly.

By individually setting the operation speeds of the clock distribution circuit and the logical circuit in accordance with the first and second operation voltages, an operation for reducing only the clock skew or an operation for increasing only the data signal delay without changing a clock skew can be carried out externally, and it is possible to solve an erroneous operation due to racing by the external operation.

The foregoing and other objects, features, aspects and advantages of the present invention will become more apparent from the following detailed description of the present invention when taken in conjunction with the accompanying diagrams.

DESCRIPTION OF THE PREFERRED EMBODIMENTS

[First Embodiment]

Figure 1:
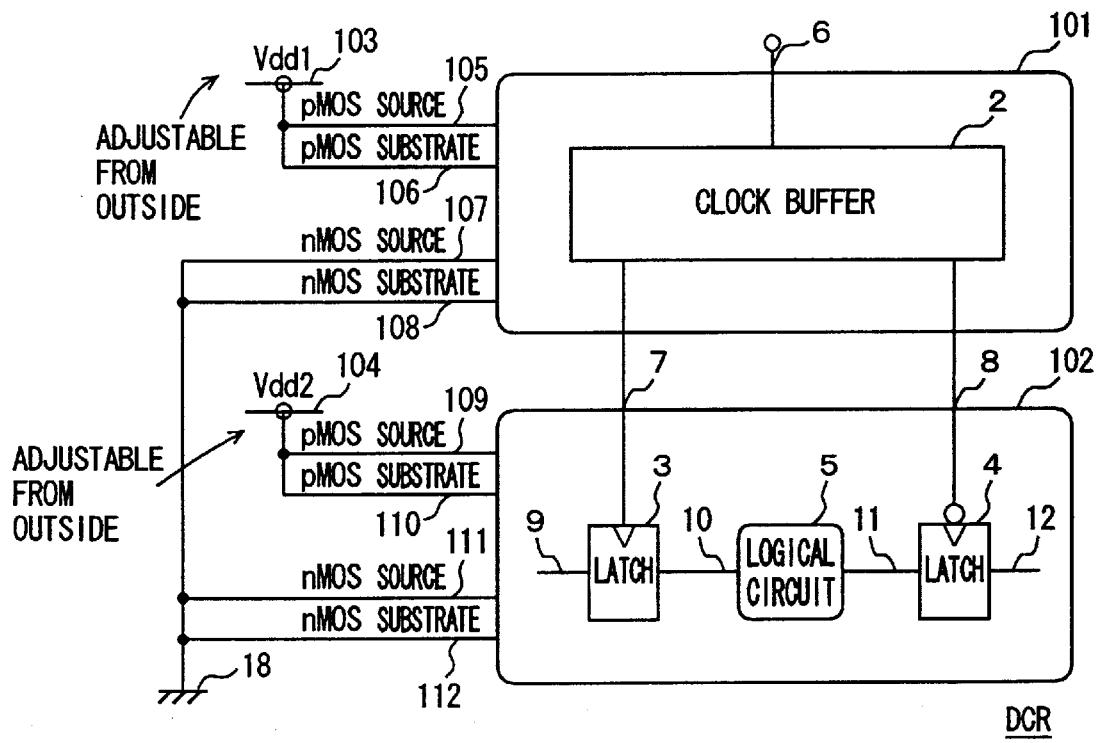
FIG. 1 is a schematic diagram showing the entire construction of a semiconductor integrated circuit device in accordance with a first embodiment of the present invention.

FIG. 1 is a schematic diagram showing the entire construction of a semiconductor integrated circuit device in accordance with the first embodiment of the present invention. In FIG. 1, a semiconductor integrated circuit device (digital core circuit DCR) includes a first circuit group 101 including a clock buffer 2, and a second circuit group including latch circuits 3 and 4 and a logical circuit 5. The constructions of clock buffer 2, latch circuits 3 and 4 and logical circuit 5 are the same as the constructions shown in FIGS. 20 and 22 to 25, and each includes P-channel and N-channel MOS transistors as components thereof This semiconductor integrated circuit is a CMOS (Complementary MOS) integrated circuit.

A common source node 105 of P-channel MOS transistors and a common substrate node 106 of the P-channel MOS transistors in the first circuit group 101 are connected to a power supply node 103 that commonly supplies a first high level operation power supply voltage Vdd1 thereto. In the same manner, a common source node 107 and a common substrate node 108 of N-channel MOS transistors included in the first circuit group 101 are connected to a ground node 18 for supplying a ground voltage GND.

In the second circuit group 102, a common source node 109 and a common substrate node 110 of P-channel MOS transistors are coupled to a second power supply node 104 for supplying a second high level power supply voltage Vdd2. A common source node 111 and a common source node 112 for N-channel MOS transistors are commonly connected to a ground node 118.

Power supply voltages Vdd1 and Vdd2 on power supply nodes 103 and 104 have their voltage levels individually set. In general, in the MOS transistor, the higher the voltage level of operation power supply voltage Vdd, the faster the operation speed becomes. Therefore, power supply voltages Vdd1 and Vdd2 of power supply nodes 103 and 104 have their voltage levels individually set to be made different in voltage level from each other. Thus, the operation speeds of clock buffer 2 and logical circuit 5 can be changed individually, thereby making the operation speed of clock buffer 2 different from the operation speed of (latch circuits 3, 4 and) logical circuit 5.

A description will be given of a case in which power supply voltage Vdd1 of one operating power supply voltage (high level power supply voltage) to the first circuit group 101 is set to be higher than power supply voltage Vdd2 of one operating power supply voltage to the second group of circuit 102, for example. In this case, the operation speed of the first circuit group 101 becomes faster than the operation speed of the second circuit group 102.

Figure 22:
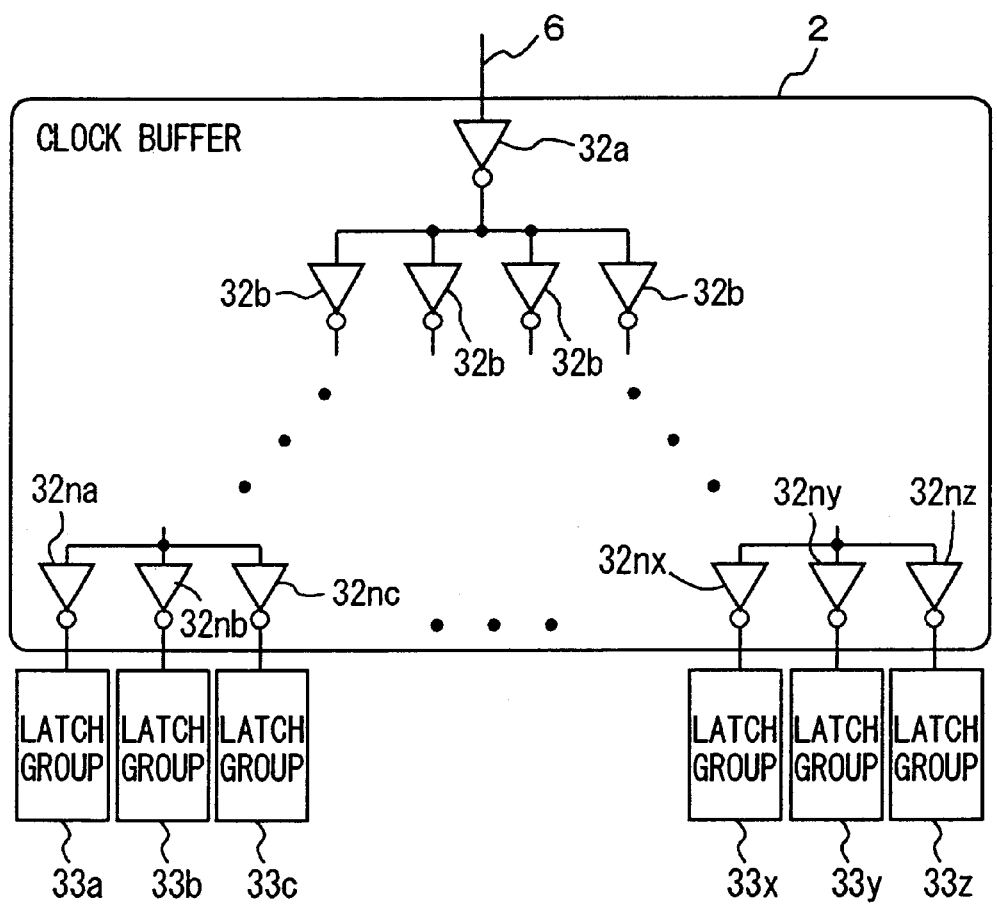
FIG. 22 is a schematic diagram showing an example of a construction of a clock buffer shown in FIG. 19.
Figure 23:
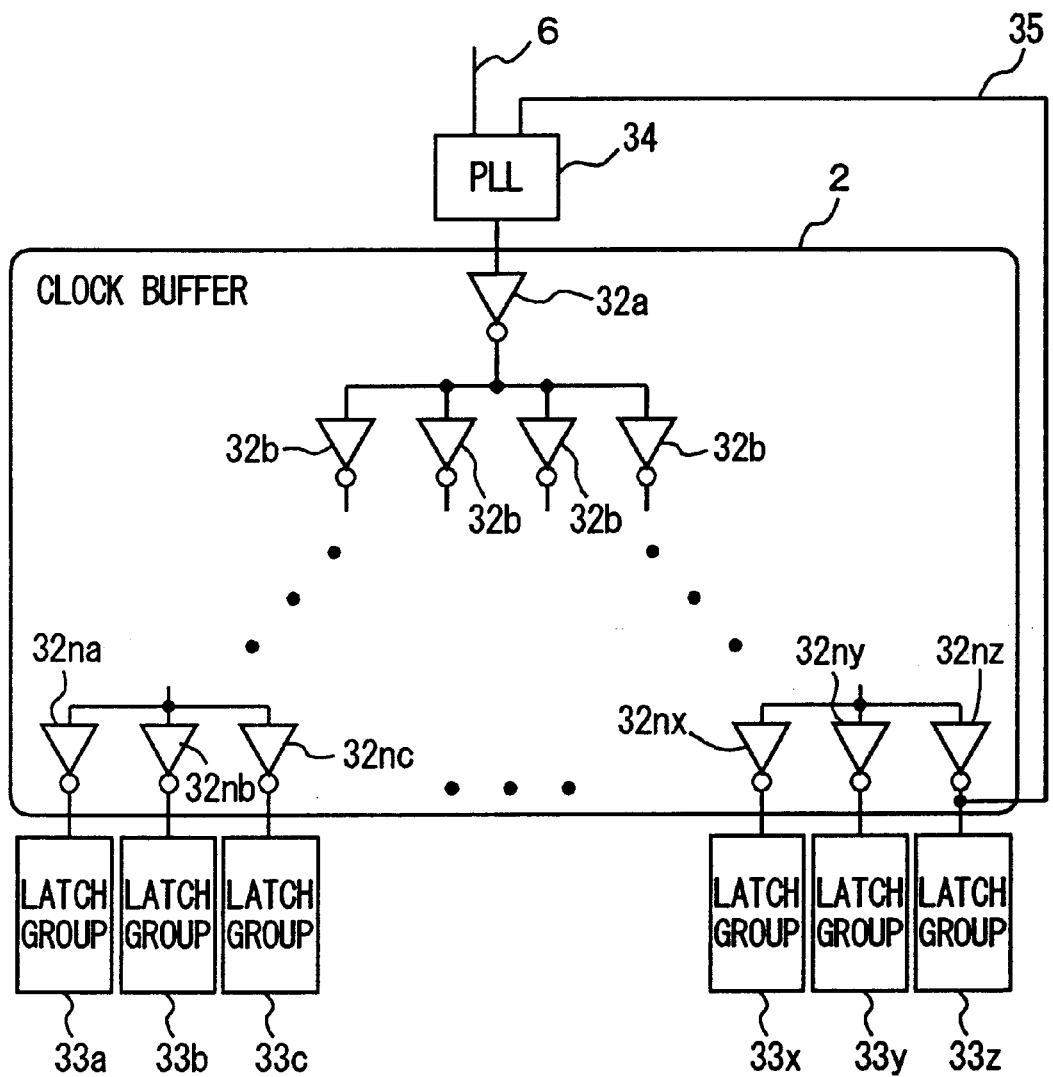
FIG. 23 is a schematic diagram showing a modification of the clock buffer shown in FIG. 19.
Figure 24:
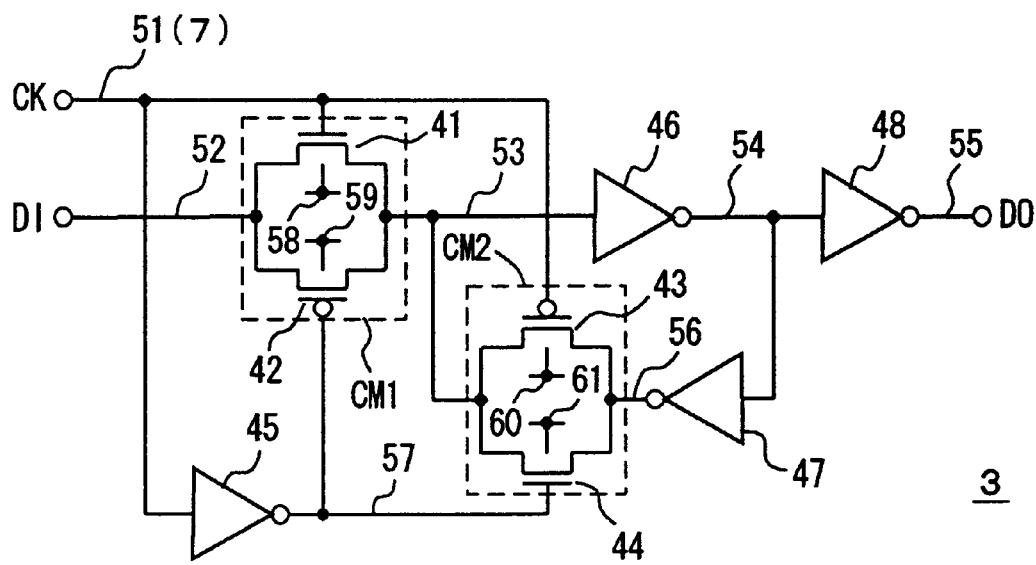
FIG. 24 is a diagram showing an example of a construction of an input-stage latch circuit shown in FIG. 19.
Figure 25:
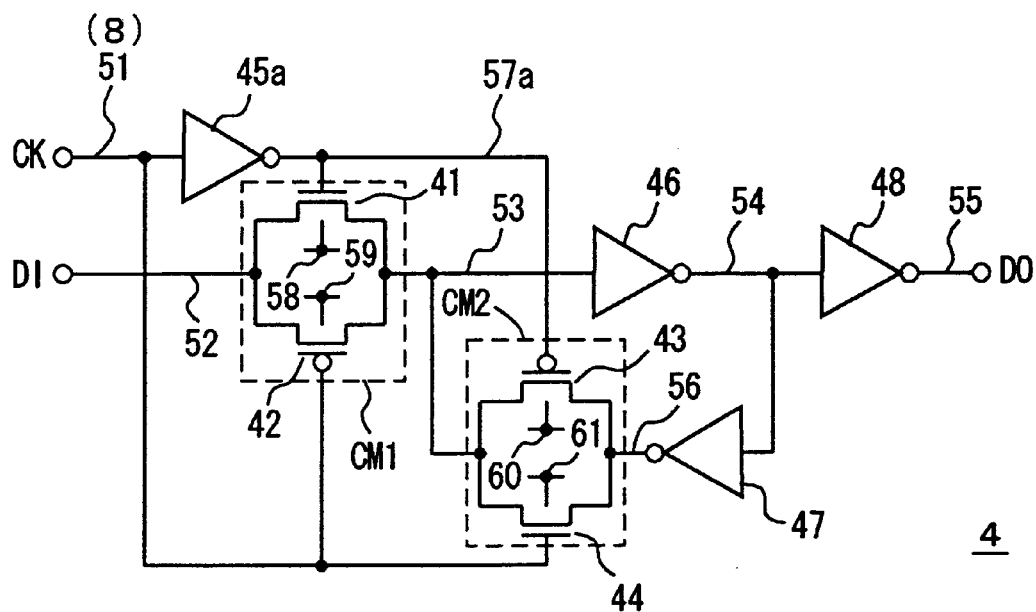
FIG. 25 is a diagram showing an example of a construction of an output-stage latch circuit shown in FIG. 19.
Figure 26A:
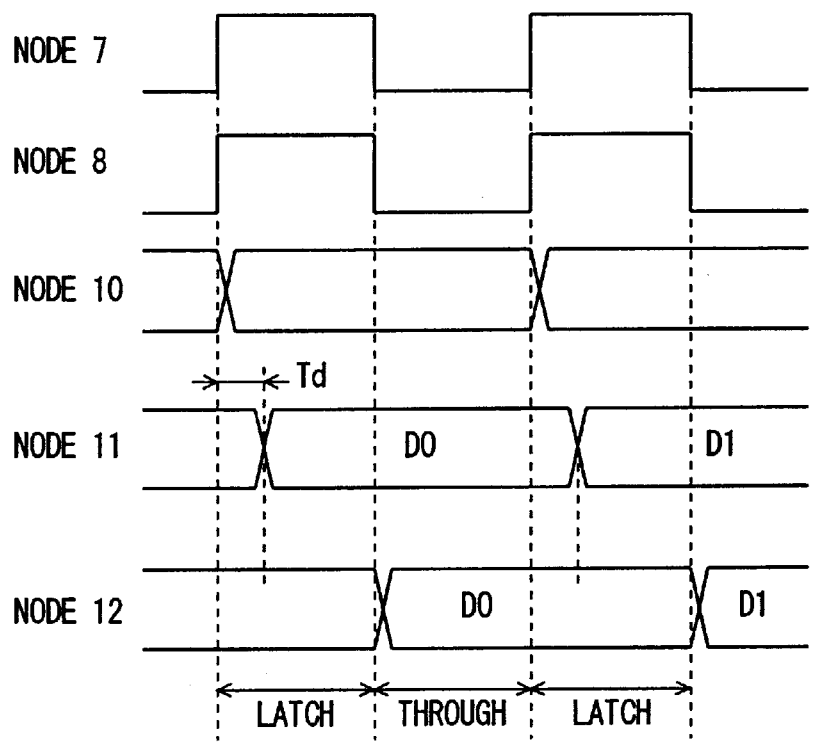
FIG. 26A is a signal wave form diagram representing a signal transferring operation in a logical circuit group.
Figure 26B:
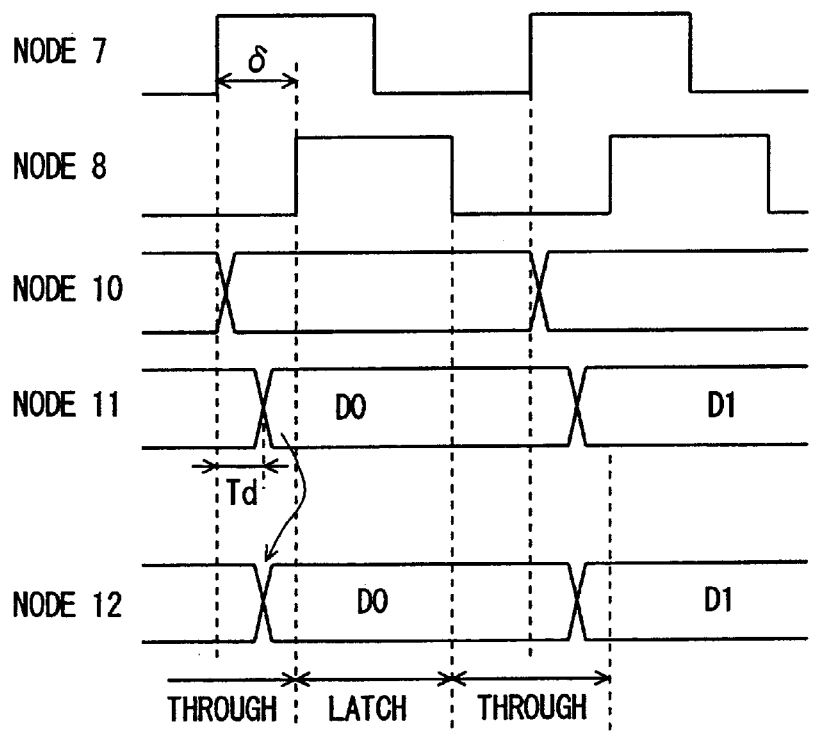
FIG. 26B is a signal wave form diagram representing the timing at which a racing occurs in a signal transferring process in the logical circuit group.

In the case where clock buffer 2 has a construction as shown in FIGS. 22 and 23, the operation speeds of inverters 32a, 32na to 32nz are increased, thereby making faster all the clock signal propagation paths from clock input node 6 to respective latch groups 33a to 33z. Therefore, it is possible to minimize an offset in the arrival timing of the clock signal, that is, a clock skew, at each of latch groups 33a–33z. Therefore, it is possible to reduce only the clock skew 5 . For this reason, in FIG. 26B, for example, it is possible to reduce a delay of the clock signal in clock input node 8 relative to the clock signal on clock input node 7. Therefore, it is possible to shorten the clock skew time 5 shown in FIG. 26B, and to make the clock skew time δ shorter than the propagation delay time Td in which the output signal of logical circuit 5 is transmitted to node 11. Consequently, before the arrival of the output signal of logical circuit 5 at node 11, latch circuit 4 is set in the latch state, thereby making it possible to eliminate a racing.

Moreover, in the case where, in the event of a racing, the voltage level of power supply voltage Vdd1 is kept constant without any change thereto while power supply voltage Vdd2 is set lower than power supply voltage Vdd1, the operation speed of the first circuit group 101 is not changed, and only the operation speed of the second circuit group 102 is slowed down. In this case also, referring to FIG. 26B, the signal propagation delay time Td in logical circuit 5 becomes longer, and the signal of node 11 can change after latch circuit 4 enters the latch state, thereby making it possible to eliminate a racing.

As described above, with the arrangement of allowing individual setting of power supply voltages Vdd1 and Vdd2 determining the operation speeds of the first circuit group 101 and the second circuit group 102, only the clock skew can be reduced, or only the propagation delay of the output signal of the logical circuit can be increased without causing any change in the clock skew. Thus, it becomes possible to eliminate an erroneous operation due to racing through an external operation.

These power supply nodes 103 and 104 may be coupled to power supply terminals outside the LSI chip separately, or may have the respective voltages individually set in accordance with the voltage from a common power supply terminal. Moreover, internal power supply circuits for generating power supply voltages Vdd1 and Vdd2 individually from an external power supply voltage VDD may be provided for the power supply nodes 103 and 104 separately.

Figure 18:
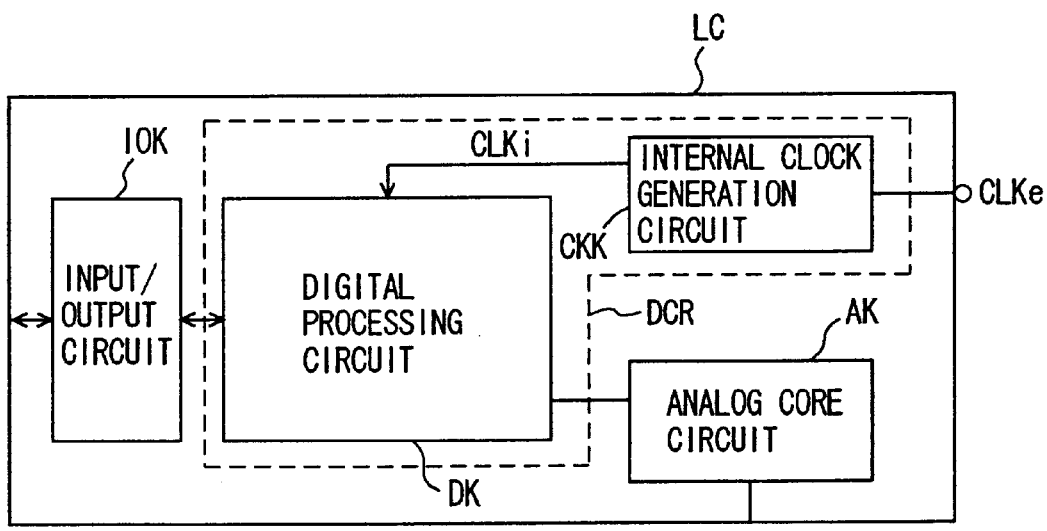
FIG. 18 is a schematic diagram showing an example of the entire construction of an LSI chip.
Figure 19:
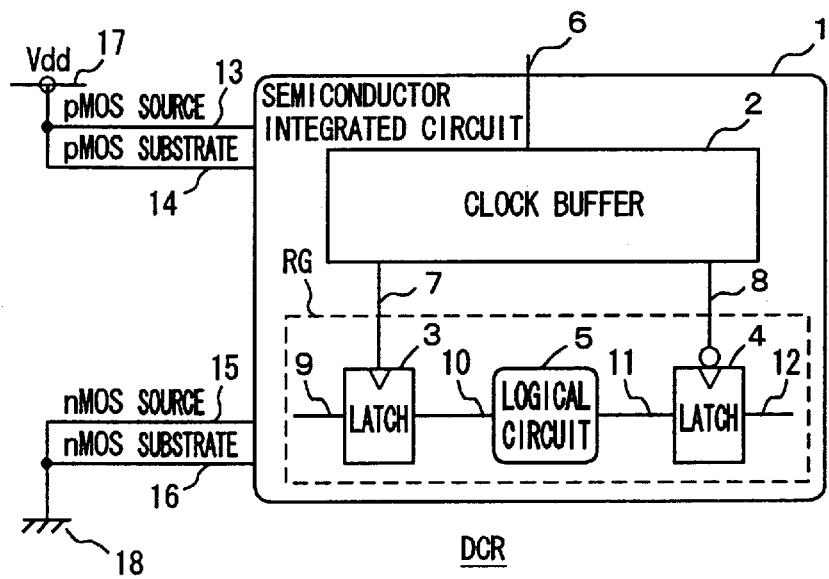
FIG. 19 is a schematic diagram showing the entire construction of a digital core circuit (semiconductor integrated circuit device) shown in FIG. 18.

Here, with respect to a specific arrangement for adjusting the power supply-voltage levels of power supply nodes 103 and 104, in the case where only one power supply terminal is available in an LSI chip (a semiconductor integrated circuit device; see FIG. 18), power supply circuits which can adjust the output voltage levels may be provided for the respective power supply nodes 103 and 104 separately, and the levels of voltages produced from these power supply circuits are adjusted individually. For such a power supply circuit, for example, a program circuit (using a fuse element) may be utilized, or a voltage dividing circuit which can set its output voltage level individually in accordance with a selection signal may be used as each of the power supply circuits.

Moreover, logical circuit 5 may be a multiple-input logical circuit, alternative to a CMOS inverter, In the case of the multiple-input logical circuit, data signals, transferred from a plurality of latch circuits, are inputted in parallel with each other. Therefore, latch circuit 3 and logical circuit 5 need not be placed in one-to-one correspondence relationship, and in accordance with the contents of the logical process in this circuit stage, interconnections between logical circuit 5 and latch circuits 3 and 4 are determined.

As described above, in accordance with the first embodiment of the present invention, the first circuit group including a clock buffer and the second circuit group including a logical circuit and latch circuits are adapted to have their respective operation power supply voltages individually set. Thus, the operation speeds of the first and second circuit groups can be individually set, and it becomes possible to externally carry out operations, such as a reducing of a clock skew and an adjusting of a signal propagation delay with the clock skew being fixed. Consequently, an erroneous operation due to the racing can be reliably solved by an operation externally applied even in the event of a racing.

[Second Embodiment]

Figure 2:
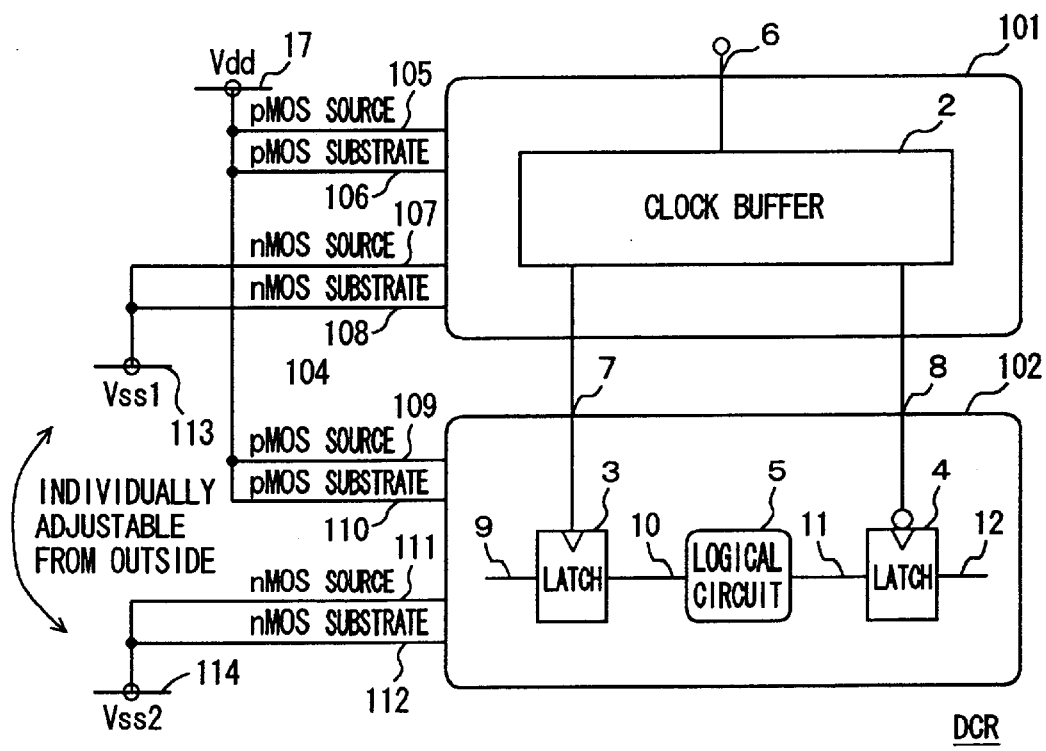
FIG. 2 is a schematic diagram showing the entire construction of a semiconductor integrated circuit device in accordance with a second embodiment of the present invention.

FIG. 2 is a schematic diagram showing the construction of a semiconductor integrated circuit device in accordance with the second embodiment of the present invention. In FIG. 2, a semiconductor integrated circuit device, that is, a digital core circuit DCR, has the same construction as the construction shown in FIG. 1, and includes a first circuit group 101 including a clock buffer 2, and a second circuit group including a logical circuit 5 and latch circuits 3 and 4. A common source node 105 and a common substrate node 106 for P-channel MOS transistors in the first circuit group 101 are commonly connected to a power supply node 17 that supplies an operation power supply voltage Vdd. A common source node 109 and a common substrate node 110 for P-channel MOS transistors in the second circuit group 102 are also connected commonly to the power supply node 17. Therefore, common power supply voltage Vdd is supplied to the first circuit group 101 and the second circuit group 102 as a high level operation power supply voltage.

With respect to N-channel MOS transistors included in the first circuit group 101, a common source node 107 and a common substrate node 108 are commonly coupled to a third power supply node 13 for supplying a first low level power supply voltage Vss1. With respect to N-channel MOS transistors included in the second circuit group 102, a common source node 111 and a common substrate node 112 are coupled to a fourth power supply node 114 for supplying a second low level power supply voltage Vss2.

Therefore, the low level power supply voltages of the first circuit group 101 and the second circuit group 102 can be respectively set to voltage levels different from ground voltage from outside in an individual manner. Low level power supply voltages Vss1 and Vss2 of third power supply node 113 and fourth power supply node 114 have their voltage levels set individually. In general, in the MOS transistor, in the case where a difference between its high level power supply voltage and its low level power supply voltage is great, the absolute value of the gate to source voltage of P-channel MOS transistor and N-channel MOS transistor becomes greater, resulting in an increased operation speed. Therefore, by making the voltage levels of low level power supply voltages Vss1 and Vss2 different from each other, the operation speeds of the first circuit group 101 and the second circuit group 102 can be changed individually and independently.

In the event of a racing, low level power supply voltage Vss1 is set to be lower than low level power supply voltage Vss2 while maintaining the level of low level power supply voltage Vss2, for example. In this case, in the first circuit group 101, the operation speed of clock buffer 2 increases, resulting a reduced clock skew (for the same reason as the first embodiment). Therefore, even when the operation speed of the second circuit group 102 is not changed, the clock skew δ is shortened, and therefore, before the signal of data node 11 changes, the latch circuit 4 is set to the latch state, thereby eliminating an erroneous operation due to the racing.

Moreover, in the case where, in the event of a racing, only low level power supply voltage Vss2 is set to be lower than low level power supply voltage Vss1, while maintaining the level of low level power supply voltage Vss1, the operation speed of the second circuit group 102 increases. In this case, the propagation delay time Td in a signal from latch circuit 3 to latch circuit 4 is shortened, and therefore, even without any change in the clock skew, latch circuit 4 is set in the latch state before the signal in internal data node 11 changes, thereby making it possible to eliminate the racing.

Therefore, with this arrangement in which low level power supply voltages Vss1 and Vss2 are made individually settable, it is possible to eliminate a erroneous operation due to a racing by an external operation.

With respect to these low level power supply voltages Vss1 and Vss2, a circuit for generating a negative voltage lower than a ground voltage may be utilized, or low level power supply voltages Vss1 and Vss2 may be set to be higher than the ground voltage level. In either of the cases, by using, for example, a voltage-dividing circuit and a negative voltage generation circuit, it is possible to set low level power supply voltages Vss1 and Vss2 of these third and fourth power supply nodes 113 and 114 at voltage levels different from the ground voltage level individually.

As described above, in accordance with the second embodiment of the present invention, low level power supply voltages of the first and second circuit groups are made individually settable. Thus, even in the event of a racing, it is possible to eliminate an erroneous operation due to the racing by externally applying an operation.

[Third Embodiment]

Figure 3:
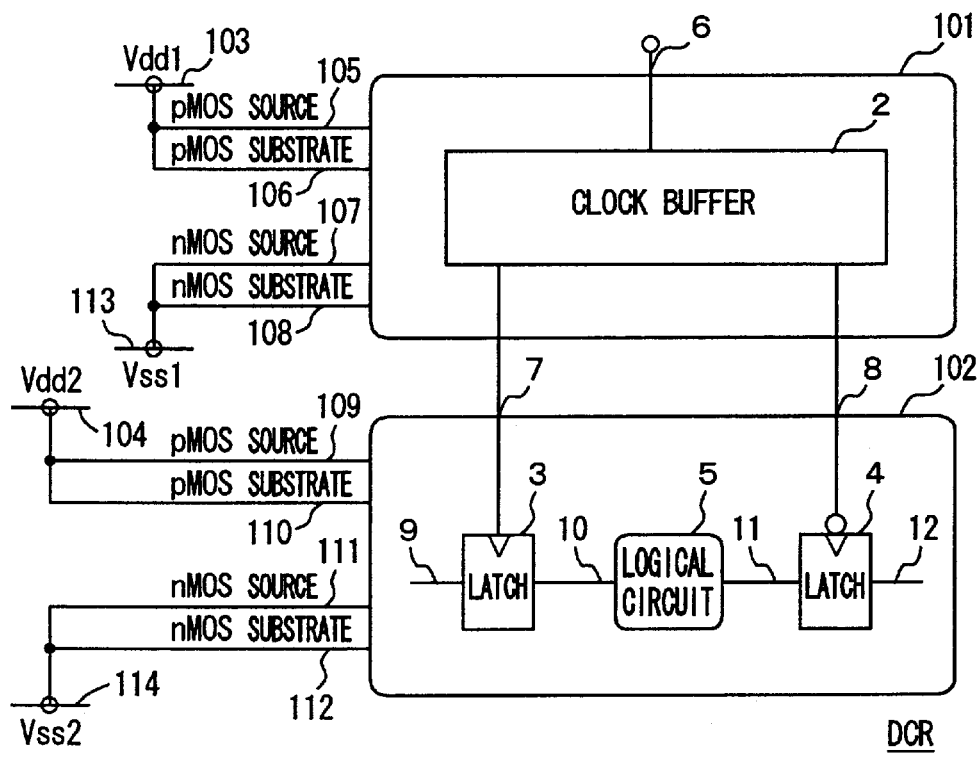
FIG. 3 is a schematic diagram showing the entire construction of a semiconductor integrated circuit device in accordance with a third embodiment of the present invention.

FIG. 3 is a schematic diagram showing the construction of a main portion of a semiconductor integrated circuit device in accordance with the third embodiment of the present invention. The semiconductor integrated circuit device shown in FIG. 3 is different from the construction of the semiconductor integrated circuit device shown in FIG. 1 in the following points. Specifically, in the first circuit group 101, a common source node 107 and a common substrate node 108 for N-channel MOS transistors are connected to a third power supply node 113 for supplying a low level power supply voltage Vss1. In the second circuit group 102, a common source node 111 and a common substrate node 112 are commonly coupled to a fourth power supply node 114.

With respect to low level power supply voltages Vss1 and Vss2 of third power supply node 113 and fourth power supply node 114, their voltage levels can be set individually and independently.

With respect to the source nodes and substrate nodes of P-channel MOS transistors, their constructions are the same as those of the first embodiment shown in FIG. 1, and the corresponding parts are indicated by the same reference numerals, and the description thereof is omitted. Specifically, high level power supply voltages Vdd1 and Vdd2, whose voltage levels can be set individually, are supplied to the first circuit group 101 and second circuit group 102, respectively.

In the construction shown in FIG. 3, the voltage levels of the high level power supply voltages and low level power supply voltages of the first circuit group 101 and second circuit group 102 can be each set independently, and therefore, it is possible to provide the same effects as the first and second embodiments.

Moreover, finer voltage setting can be achieved in accordance with operation conditions, such as the setting that first high level power supply voltage Vdd1 is set to be lower than second high level power supply voltage Vdd2 with first low level power supply voltage Vss1 being set to lower than second low level power supply voltage Vss2, for example. Therefore, it is possible to prevent an erroneous operation due to a racing without reducing the operation speed more than necessary. In other words, while an accurate latch operation is carried out by making the signal amplitude of the first circuit group 101 smaller than the signal amplitude of the second circuit group 102, the operation speeds of these first circuit group 101 and second circuit group 102 can be adjusted. In the case where the signal amplitude becomes smaller, the charging and discharging currents can be reduced as compared with the case in which the signal amplitude is greater, and therefore, it becomes possible to reduce the current consumption. Moreover, the center values of the signal amplitudes of the first and second groups of circuits 101 and 102 can be set to the same value to make the rising and falling characteristics of a signal of the first and second circuit groups identical to each other, while solving the problem of racing.

In other words, in accordance with the third embodiment of the present invention, the high level power supply voltage and low level power supply voltage of the first and second groups of circuits are set individually and independently, so that a problem caused by a racing can be solved by an external operation. In addition, a finer voltage setting can be carried out in accordance with the operation conditions. Thus, the center values of the signal amplitudes of the first and second groups of circuits can be set to the same value to make the signal rising and falling characteristics identical to each other. Thus, it becomes possible to eliminate an erroneous operation due to a racing by an external operation.

[Fourth Embodiment]

Figure 4:
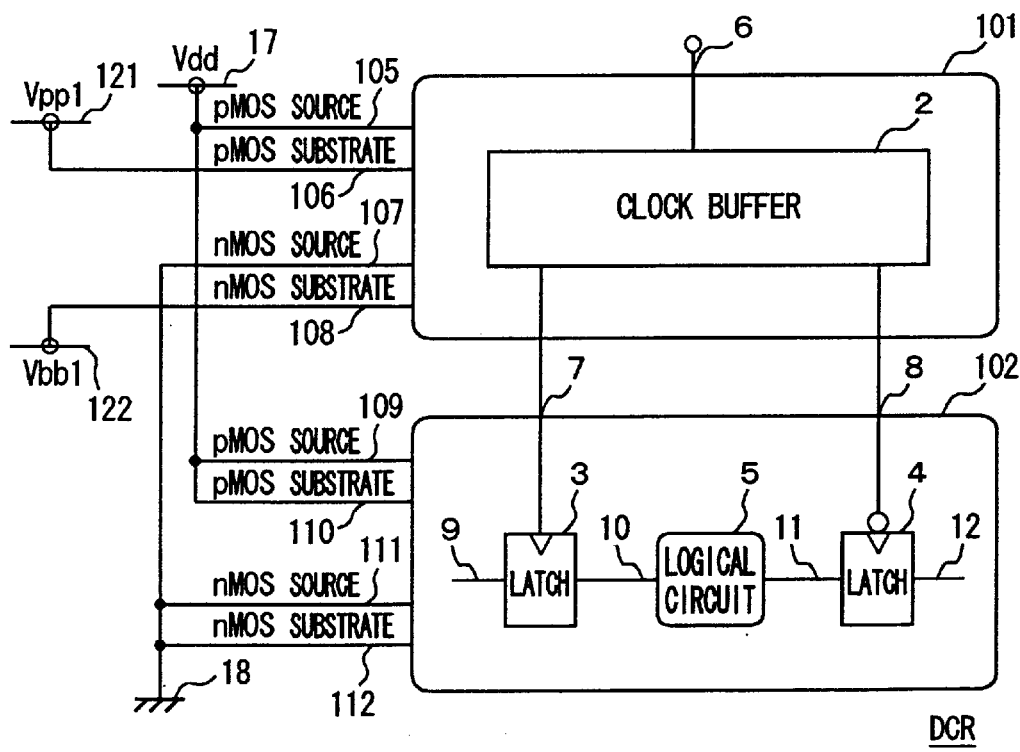
FIG. 4 is a schematic diagram showing the entire construction of a semiconductor integrated circuit device in accordance with a fourth embodiment of the present invention.

FIG. 4 is a schematic diagram showing the entire construction of a semiconductor integrated circuit device in accordance with the fourth embodiment of the present invention. In FIG. 4, with respect to a first circuit group 101, a common source node 105 and a common substrate node 106 for P-channel MOS transistors are connected to a power supply node 17 and a back gate power supply node 121, respectively. A back gate voltage Vpp1 is supplied to common back gate power supply node 121. Moreover, for N-channel MOS transistors in this first circuit group 101, a common source node 107 is connected to a ground node 18 and a common substrate node 108 is connected to a back gate power supply node 122 for supplying a back gate voltage Vbb1.

In the second circuit group 102, a common source node 109 and a common substrate node 110 for P-channel MOS transistors are commonly connected to a power supply node 17. A common source node 101 and a common substrate node 112 for N-channel MOS transistors are commonly connected to a ground node 18.

These back gate voltages Vpp1 and Vbb1 can be externally adjusted in voltage level to be set to voltage levels that are respectively different from high level power supply voltage Vdd1 and low level power supply voltage GND.

In general, in the N-channel MOS transistor, in the case where the voltage of the back gate, or the substrate node, is reduced below the voltage of the source node, the back gate bias becomes deeper, resulting in an increase in the threshold voltage Vthn due to the substrate effect. In general, in the P-channel MOS transistor, in the case where the voltage of the substrate node (back gate) is raised above the voltage of the source node, the back gate bias becomes deeper, resulting in an increase in absolute value of the threshold value voltage (the threshold voltage is set to a more negative value).

Figure 21:
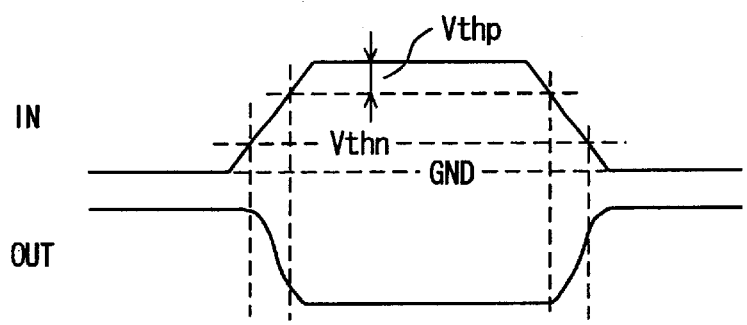
FIG. 21 is a signal wave form diagram representing the operation of the logical circuit shown in FIG. 20.

In the case where the absolute value of the threshold value is increased, in the signal waveform diagram shown in FIG. 21 for example, with respect to the voltage change on gate node 23 of N-channel MOS transistor 22, the timing at which this N-channel MOS transistor transitions from the non-conductive state to the conductive state is delayed. In addition, the current between the source and drain of the N-channel MOS transistor in the conductive state is determined by the difference between the gate voltage and the threshold voltage so that the drain current is reduced and the operation speed of the circuit is also reduced correspondingly.

In contrast, in the case where the voltage of the substrate node is increased in the N-channel MOS transistor above the voltage of the source node, the back gate bias becomes shallower, resulting in a reduction in threshold voltage Vthn. In contract, in the P-channel MOS transistor, in the case where the voltage of the substrate node is reduced below the voltage of the source node, since the absolute value Vthp of the threshold value voltage becomes smaller, the back gate bias becomes shallower, resulting in an increase in operation speed of the circuit.

Figure 20:
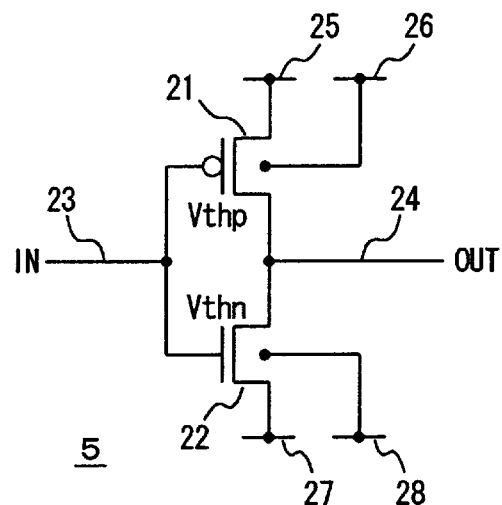
FIG. 20 is a diagram showing an example of a construction of a logical circuit shown in FIG. 19.

Clock buffer 2 utilizes the inverter circuit shown in FIG. 20 as its basic element, and logical circuit 5 includes a P-channel MOS transistor and an N-channel MOS transistor in its basic construction. Even in the case where the logical circuit is constituted by only pass transistors, the conduction/non-conduction timing of the pass transistor in logical circuit 5 changes in accordance with the absolute value of the threshold voltage in the same manner, and the on-resistance also changes correspondingly. Thus, the operation speed can be also changed.

Therefore, in the arrangement shown in FIG. 4, back gate voltage Vpp1 is set to be lower than high level power supply voltage Vdd or back gate voltage Vbb1 is set to be higher than the ground voltage. Thus, the operation speed of the first circuit group 101 is made faster, thereby making it possible to reduce the clock skew.

Voltages of these back gate power supply nodes 121 and 122 are set in voltage level externally by selectively activating a charge pump circuit, for example. Thus, it becomes possible to adjust the operation speed of the first circuit group 101, and consequently to eliminate an erroneous operation due to a racing by an external operation.

In this case, back gate voltages Vpp1 and Vbb1 need to be set to voltage levels at which the PN junction between the source/drain area and the substrate area of P and N-channel MOS transistors is not biased in a forward direction.

In the case of the construction shown in FIG. 4, back gate voltage Vpp1 is set to a voltage level lower than power supply voltage Vdd, while back gate voltage Vbb1 is set to a voltage level higher than the ground voltage. Therefore, in this case, these back gate voltages Vpp1 and Vbb1 may be generated by using a voltage-dividing circuit using resistors.

As described above, in accordance with the fourth embodiment of the present invention, the back gate voltage level of the MOS transistors of the components of the first circuit group can be individually set externally. Thus, the operation speed of the first circuit group can be changed externally, so that it is possible to eliminate an erroneous operation due to a dock skew by an external operation.

[Fifth Embodiment]

Figure 5:
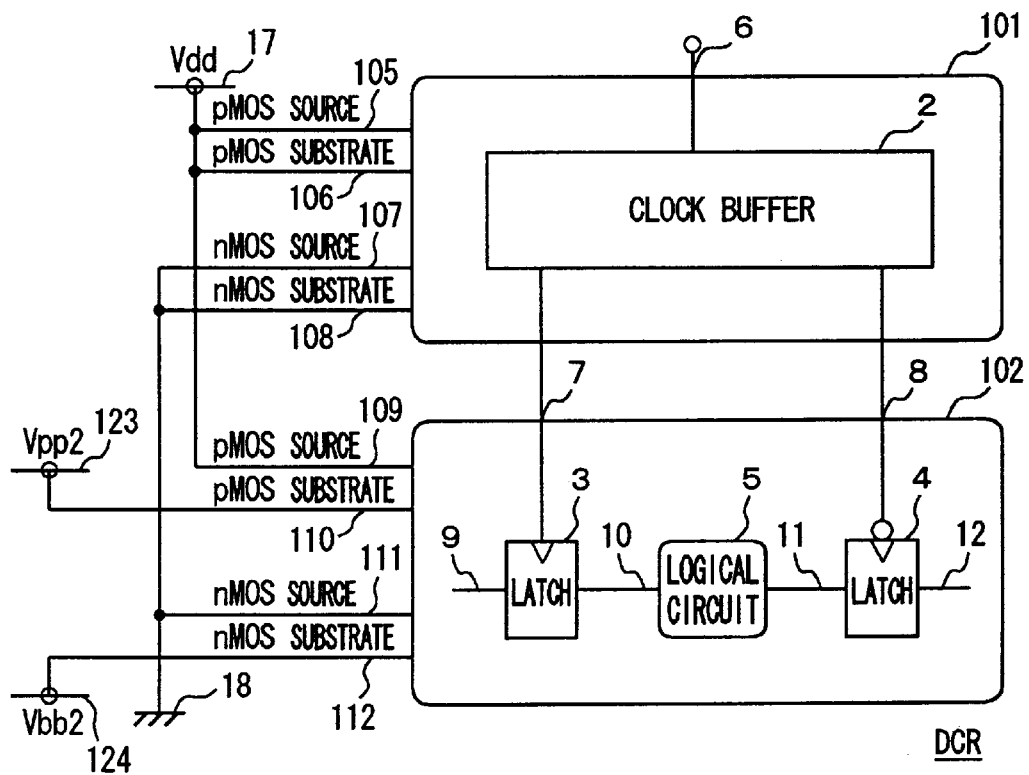
FIG. 5 is a schematic diagram showing the entire construction of a semiconductor integrated circuit device in accordance with a fifth embodiment of the present invention.

FIG. 5 is a schematic diagram showing the construction of a semiconductor integrated circuit device in accordance with the fifth embodiment of the present invention. In FIG. 5, with respect to a second circuit group 102, a common substrate node 110 of P-channel MOS transistors is connected to a back gate power supply node 123 for supplying back gate voltage Vpp2, and with respect to the second circuit group 102, a common substrate node 112 of N-channel MOS transistors is coupled to a back gate power supply node 124 for supplying a back gate voltage Vbb2.

Moreover, in the second circuit group 102, a common source node 109 of P-channel MOS transistors is connected to a power supply node 17, and a common source node 111 of N-channel MOS transistors is connected to a ground node 18. Back gate voltages Vpp2 and Vbb2 of back gate power supply nodes 123 and 124 can be externally set in voltage level separately from the power supply voltage and the ground voltage.

In the first circuit group 101, a common source node 105 of P-channel MOS transistors and a common substrate node 106 of P-channel MOS transistors are commonly connected to a power supply node 17, and a common source node 107 of N-channel MOS transistors and a common substrate node 108 of N-channel MOS transistors are commonly connected to a ground node 18.

In the case of the construction shown in FIG. 5, both of the first and second groups of circuits 101 and 102 commonly receive the voltages Vdd and GND as operation power supply voltages. Back gate voltage Vpp2 is set higher than power supply voltage Vdd and/or back gate power supply voltage Vbb2 is set lower than ground voltage GND of ground node 18. Thus, the absolute value of the threshold voltage of MOS transistors included in the second circuit group 102 can be set higher, and accordingly, the operation speed of the second circuit group is reduced so that the signal propagation delay from node 10 to node 11 can be increased. In this case, since there is no change in the clock skew, it is possible to eliminate an erroneous operation due to a racing by an external operation in the same manner as the first embodiment.

Back gate voltage Vpp2 shown in FIG. 5 is set higher than power supply voltage Vdd, and therefore, it is possible to generate back gate voltage Vpp2 by utilizing a boosting circuit using, for example, a charge pump circuit. In the same manner, back gate voltage Vbb2 is made lower than the ground voltage level, and therefore, it is possible to generate back gate voltage Vbb2 by utilizing a charge pump circuit for generating a negative voltage, for example. When these charge pump circuits are set in the non-active state, the operation power supply voltage and ground voltage are generated from power supply voltage Vdd as back gate voltages Vpp2 and Vbb2.

As described above, in accordance with the fifth embodiment of the present invention, the back gate voltage of the transistors of the second circuit group is individually set to voltage levels that are different from the power supply voltage and the ground voltage, respectively. Thus, it is possible to change the operation speed of the second circuit group, and consequently to eliminate an erroneous operation due to a racing by an external operation.

[Sixth Embodiment]

Figure 6:
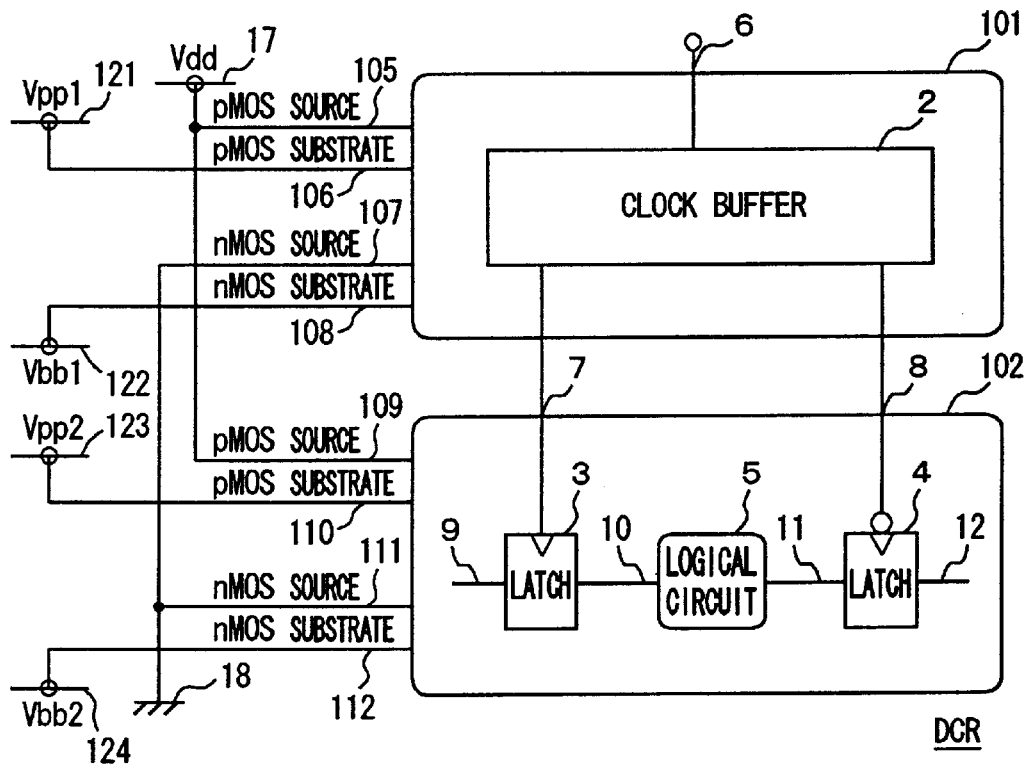
FIG. 6 is a schematic diagram showing the entire construction of a semiconductor integrated circuit device in accordance with a sixth embodiment of the present invention.

FIG. 6 is a schematic diagram showing the entire construction of a semiconductor integrated circuit device in accordance with the sixth embodiment of the present invention. In the construction shown in FIG. 6, with respect to a first circuit group 101, a common substrate node 106 for P-channel MOS transistors is connected to a back gate power supply node 121, and a common substrate node 108 for N-channel MOS transistors is connected to a back gate power supply node 122. With respect to a second circuit group 102, a common substrate node of P-channel MOS transistors is connected to a third back gate power supply node 123, and a common substrate node 112 of N-channel MOS transistors is connected to a fourth back gate power supply node 124.

Common source nodes 105 and 109 of P-channel MOS transistors in the first and second circuit groups 101 and 102 are connected to power supply node 17. Common substrate nodes 108 and 111 of N-channel MOS transistors in the first and second circuit group 101 and 102 are commonly connected to ground node 18.

This construction, shown in FIG. 6, corresponds to the combined construction of the aforementioned fourth and fifth embodiments, and makes it possible to individually adjust and set the threshold values of MOS transistors in the first circuit group 101 and the second circuit group 102. Therefore, back gate voltage Vpp2 can be made lower than back gate voltage Vpp1, whit back gate voltage Vbb2 made higher than back gate voltage Vbb1, so that the first circuit group 101 are operated at a higher speed while the second circuit group 102 are operated at a slower speed. Thus, it is possible to carry out finer voltage settings such that the racing is reduced. Consequently, it becomes possible to eliminate the problem of racing without reducing the operation speed of the second circuit group 102 unnecessarily.

Figure 7:
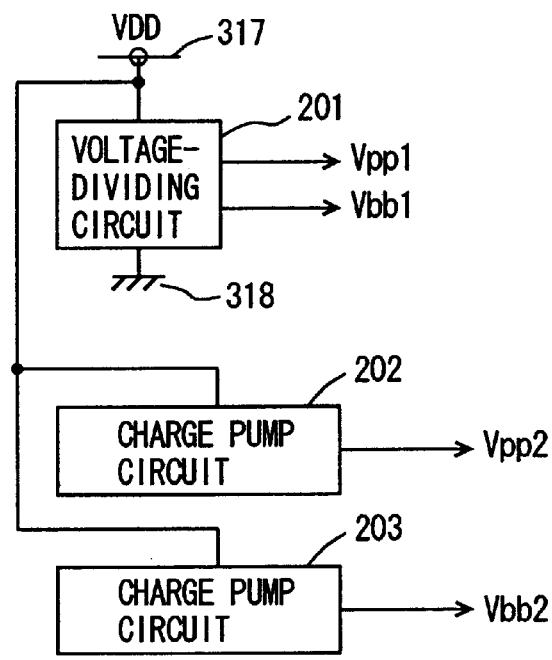
FIG. 7 is a schematic diagram showing an example of a construction of a back gate voltage generation section in accordance with the sixth embodiment of the present invention.

FIG. 7 is a diagram showing an example of a construction of a circuit for generating a back gate voltage. In FIG. 7, back gate voltages Vpp1 and Vbb1 are generated from a voltage-dividing circuit 201 which uses registers for voltage-dividing a power supply voltage Vdd of the power supply node and a ground voltage VGND of the ground node. These back gate voltages Vpp1 and Vbb1 are set to voltage levels between power supply voltage Vdd and the ground voltage level. When the back gate voltage level is altered, back gate voltages Vpp1 and Vbb1 are respectively separated from power supply node 17 and ground node 18, and instead the voltages resistance-divided by voltage-dividing circuit 201 are supplied as the back gate bias voltages Vpp1 and Vbb1. The ratio of voltage-division of the resistance-voltage-dividing circuit 201 may be set by, for example, a fuse element or a selection signal. By using the output voltage of this resistance-dividing circuit, the absolute value of the threshold voltage of MOS transistors of the first circuit group is reduced. These resistance voltage-dividing circuits also output high level power supply voltage Vdd and low level power supply voltage (ground voltage) prior to the execution of the external operation.

Back gate voltage Vpp2 is generated by a charge pump circuit 202 for generating a boosted voltage higher than power supply voltage Vdd by utilizing the charge pumping operation of a capacitor when activated. When not activated, charge pump circuit 202 generates a voltage that is the same level as power supply voltage Vdd.

Back gate voltage Vbb2 is formed from a charge pump circuit 203 that utilizes the operation of the capacitor when activated. When activated, charge pump circuit 203 generates a negative back gate voltage Vbb2 lower than the ground voltage through the charge pump operation.

When not activated, these charge pump circuits 202 and 203 output power supply voltage Vdd and ground voltage GND, respectively. The activation/non-activation of these voltage-dividing circuit 201 and charge pump circuits 202 and 203 is set in accordance with, for example, a fuse program circuit or a control signal depending on the presence or absence of a racing. In the case where a test operation is carried out so as to detect a racing, the fuse program sets the voltage level in accordance with the result of the test. Thus, it becomes possible to prevent an erroneous operation due to a racing by an external operation, that is, an external operation (for example, a fuse program) applied from the outside of the semiconductor integrated circuit device.

[Seventh Embodiment]

Figure 8:
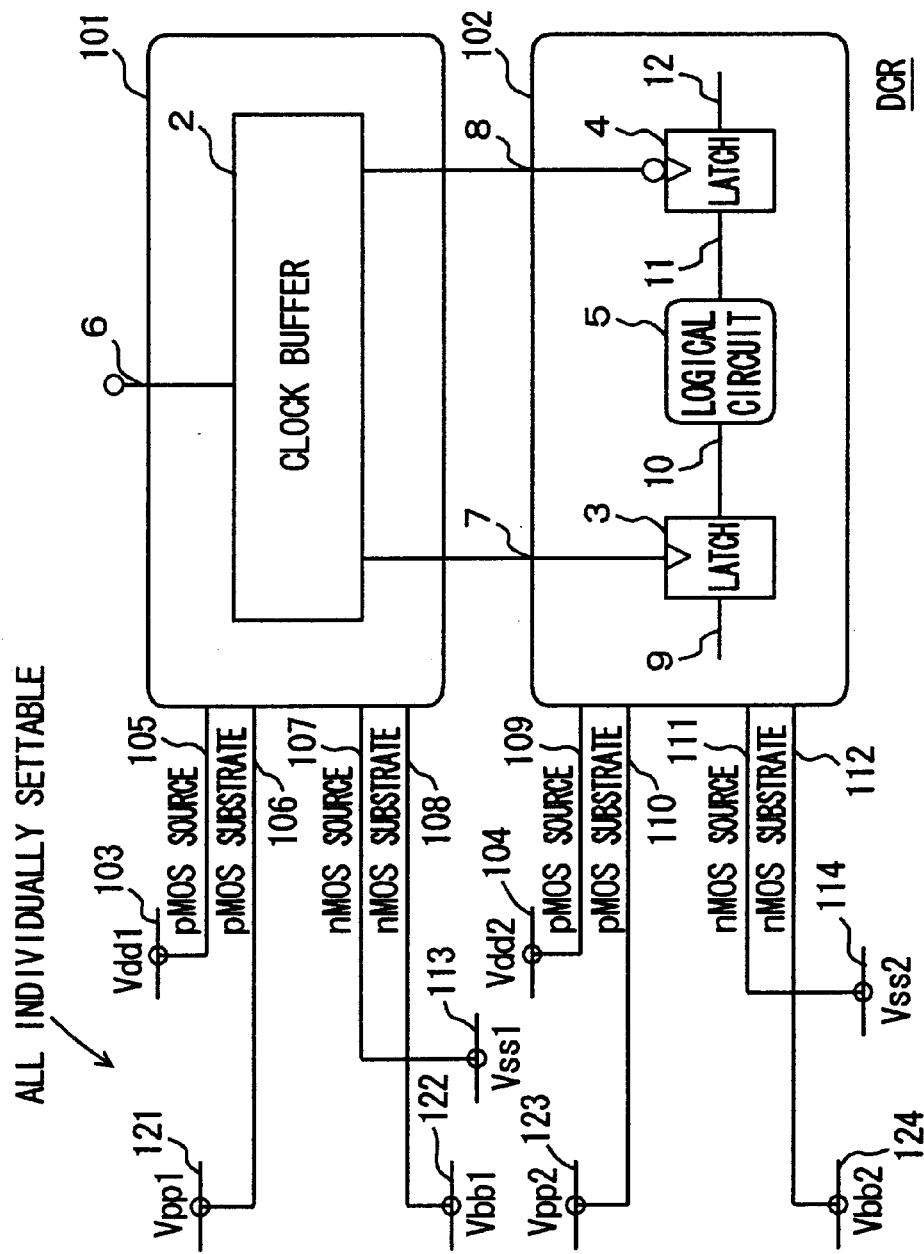
FIG. 8 is a schematic diagram showing the entire construction of a semiconductor integrated circuit device in accordance with a seventh embodiment of the present invention.

FIG. 8 is a schematic diagram showing the entire construction of a semiconductor integrated circuit device in accordance with the seventh embodiment of the present invention. In FIG. 8, with respect to a first circuit group 101, a common source node 105 for P-channel MOS transistors is connected to a first power supply node 103, and a common substrate node 106 for P-channel MOS transistors is connected to a first back gate power supply node 121. With respect to N-channel MOS transistors of the first circuit group 101, a common source node 107 is connected to a second power supply node 113 so as to receive a low level power supply voltage Vss1, and a common substrate node 108 is electrically connected to a second back gate power supply node 122 for supplying back gate voltage Vbb1.

In the second circuit group 102, with respect to P-channel MOS transistors, a common source node 109 is electrically connected to a third power supply node 104 for supplying high level power supply voltage Vdd2, and a common substrate node 110 is connected to a third back gate power supply node 123 for supplying back gate voltage Vbb1. With respect to N-channel MOS transistors, a common source node 111 is connected to a fourth power supply node 114 for supplying a low level power supply voltage Vss2, and a common substrate node 112 is connected to a fourth back gate power supply node 124 for supplying back gate voltage Vbb2.

The voltages Vdd1 and Vdd2 on first and third power supply nodes 103 and 104 are individually set in voltage level, and voltages Vss1 and Vss2 on second and fourth power supply nodes 113 and 114 are individually set in voltage level. In the same manner, voltages Vpp1 and Vpp2 on first and third back gate power supply nodes 121 and 123 are set in voltage level individually and separately from the voltages on first and third power supply nodes. Moreover, back gate voltages Vbb1 and Vbb2 on second and fourth back gate power supply nodes 122 and 124 are individually set in voltage level, separately from voltages Vss1 and Vss2 on second and fourth power supply nodes 113 and 114s.

Therefore, in the case of the construction shown in FIG. 8, in each of the first circuit group 101 and the second circuit group 102, the back gate voltage and the source voltage are respectively set individually. Thus, such a finer control operation is carried out that the operation speed of the first circuit group 101 is made faster while the operation speed of the second circuit group 102 is made slower. After the control operation for the power supply voltages, a finer adjustment of an operation speed can be carried out through adjustment of the threshold voltages or other, and thus, it is possible to carry out a finer adjustment with more precision.

Figure 9:
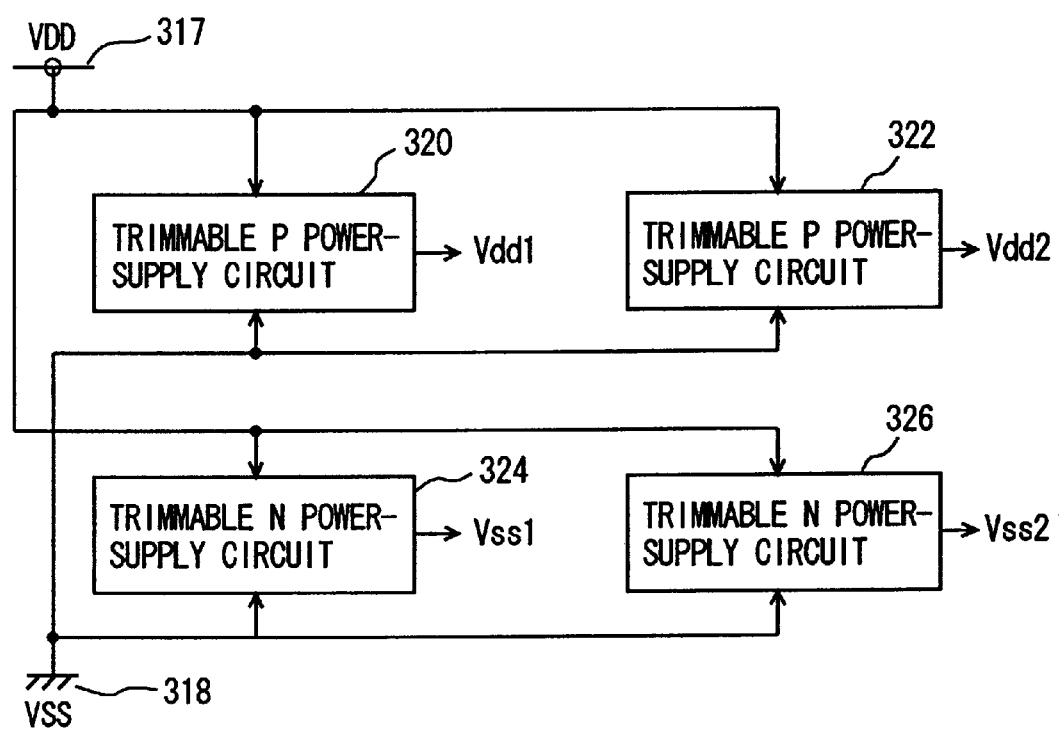
FIG. 9 is a schematic diagram showing an example of a construction of a section for generating a power supply voltage showing in FIG. 8.

FIG. 9 is a schematic diagram showing an example of a construction of a power supply in the semiconductor integrated circuit device shown in FIG. 8. In FIG. 9, a power supply voltage VDD from a power supply node 317 and ground voltage VSS (GND) on a ground node 318 are commonly applied to trimmable P power supply circuits 320 and 324 and trimaable N power supply circuits 324 and 326. Trimmable P power supply circuit 320 generates power supply voltage Vdd1 onto common source node 105 shown in FIG. 8. Trimmable P power supply circuit 322 generates power supply voltage Vdd2 onto common source node 109 shown in FIG. 8. Trimmable N power supply circuit 324 generates low level power supply voltage Vss1 onto common source node 107 shown in FIG. 8. Trimmable N power supply circuit 326 generates low level power supply voltage Vss2 onto common source node 111 shown in FIG. 8.

These trimmable P power supply circuits 320 and 322 are constituted by, for example, DC-DC converters, and the respective output voltage levels can be set by a fuse program or a voltage on a specific pad. In the same manner, trimmable N power supply circuits 324 and 326 generates voltages adjustable in level in accordance with a fuse program or a voltage on a specific pad.

In the case where a voltage higher than the ground voltage level is generated as the low level power supply voltages to Vss1 and Vss2, trimmable N power supply circuits 324 and 326 can be implemented by using programmable resistance-voltage-dividing circuits. In the case where low level power supply voltages Vss1 and Vss2 each has a variable range extended to a negative voltage level, a negative-voltage generation circuit such as a charge pump circuit can be used in each of trimmable N power supply circuits 324 and 326. In this arrangement, the level of the negative voltage level generated by this negative-voltage generation circuit is adjusted. With an arrangement in which the ground voltage level is generated when this negative-voltage generation circuit is not activated, the range of the low level power supply voltage can be extended to a negative voltage level. In the same manner, by utilizing the resistance-voltage-dividing circuit and the negative voltage generation circuit in combination, the range of voltage change of low level power supply voltages Vss1 and Vss2 can be extended to positive and negative ranges. With respect to trimmable power supply circuits 320 and 321 for generating-high level power supply voltages Vdd1 and Vdd2, the same construction can be utilized.

With respect to a power supply construction for back gate voltages Vpp1, Vpp2, Vbb1 and Vbb2, it is possible to utilize a construction shown in FIG. 7.

Here, in a power supply construction shown in FIG. 9, a single power supply construction is used in which a single power source voltage is applied externally. However, a multiple-power supply construction may be employed in which individual power supply terminals are provided for the first circuit group 101 and the second circuit group 102 respectively.

As described above, in accordance with the seventh embodiment of the present invention, in the first circuit group 101 and the second circuit group 102, the source voltage and the substrate voltage can be individually set, and therefore, the operation conditions of the first circuit group and the second circuit group can be finely set in response to operation states.

[Eighth Embodiment]

Figure 10:
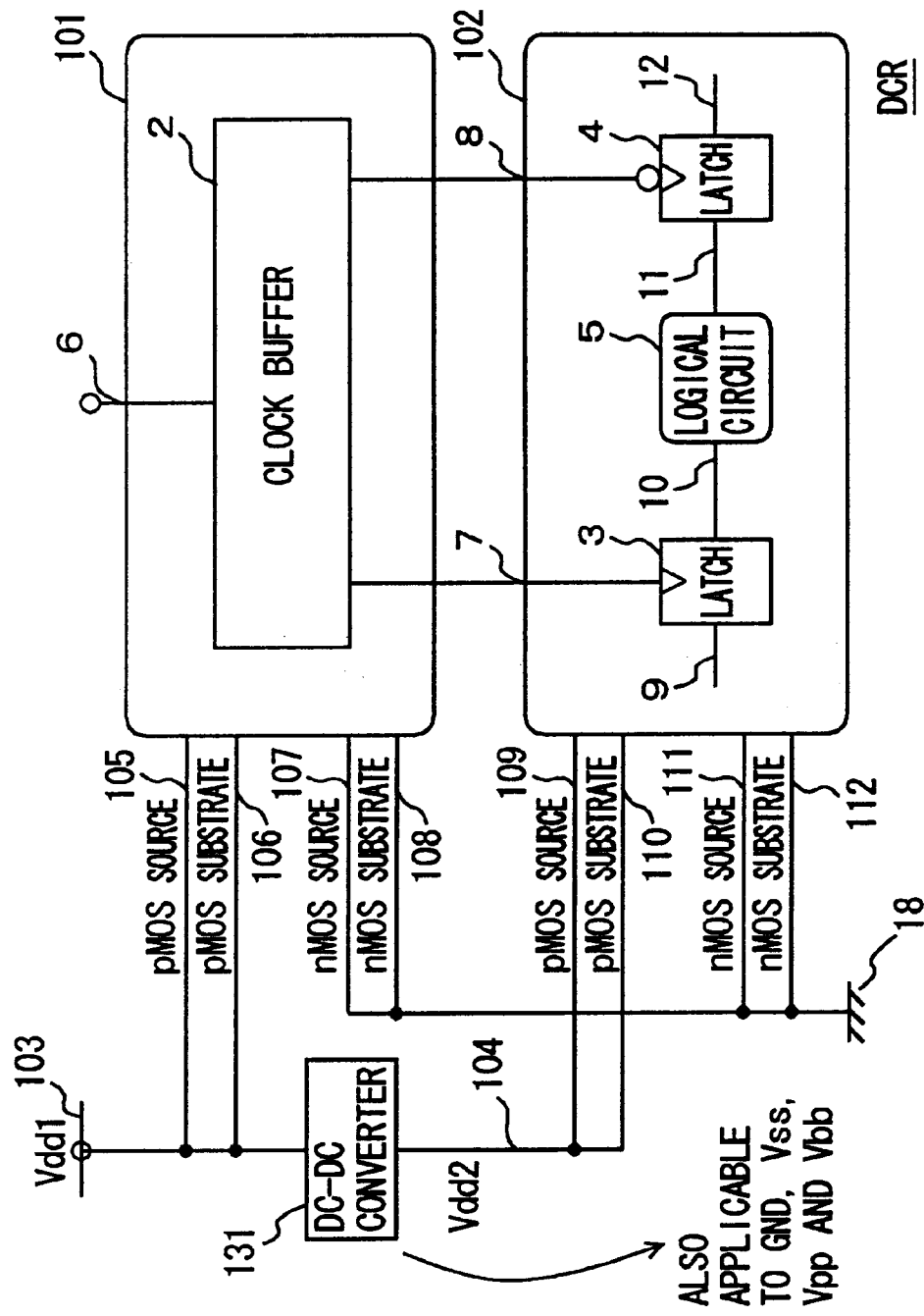
FIG. 10 is a schematic diagram showing the entire construction of a semiconductor integrated circuit device in accordance with an eighth embodiment of the present invention.

FIG. 10 is a schematic diagram showing the entire construction of a semiconductor integrated circuit device in accordance with the eighth embodiment of the present invention. In the construction shown in FIG. 10, a voltage Vdd1 on a power supply node 103 is supplied to a common source node 105 and a common substrate node 106 of P-channel MOS transistors of the first circuit group 101. With respect to N-channel MOS transistors of the first circuit group 101, a common source node 107 and a common substrate node 108 are coupled to a ground node 18.

With respect to the second circuit group 102, a high level power supply voltage Vdd2 is supplied to a common source node 109 and a common substrate node 110 of P-channel MOS transistors through a DC-DC converter 131 for converting the level of power supply voltage Vdd1 on power supply node 103. A common source node 111 and a common substrate node 112 for N-channel MOS transistors of the second circuit group 102 are connected to a ground node.

When activated, DC-DC converter 131 carries out a level conversion on the voltage Vdd on power supply node 103, and generates a voltage Vdd2 on power supply node 104. Therefore, for example, in the case where this DC-CD converter 131 reduces the voltage level, the voltage level of power supply voltage Vdd2 for the second circuit group 102 is set to be lower than power supply voltage Vdd1 for the first circuit group 101.

In the case where no erroneous operation is caused by a racing, DC-DC converter 131 is set in the non-operable state, and the voltage levels of power supply voltage Vdd1 and power supply voltage Vdd2 are set to be equal to each other. In the event of an erroneous operation due to a racing, DC-DC converter 131 is operated so that the voltage level of power supply voltage Vdd2 for the second circuit group 102 is lowered, so that the operation speed of the second circuit group is reduced. Thus, it is possible to eliminate an erroneous operation due to a racing by selectively activating DC-DC converter 131 through an external operation.

Here, as for DC-DC converter 131, a normal DC-DC converter using a switching transistor and an inductance may be used. This DC-DC converter 131 may be placed outside the LSI chip as a separated chip. Moreover, alternatively, a power supply circuit described in the seventh embodiment may be used. Furthermore, an internal voltage down converting circuit (VDC) for generating an internal voltage through a feedback control of a current driving transistor, which will be described later, may be used.

As shown in FIG. 10, in the case where DC-DC converter 131 is utilized, the operation speeds of the first circuit group 101 and the second circuit group 102 are individually set by using a single power supply. Thus, it is possible to reduce the number of power supply terminals and consequently to reduce the chip area.

Figure 11:
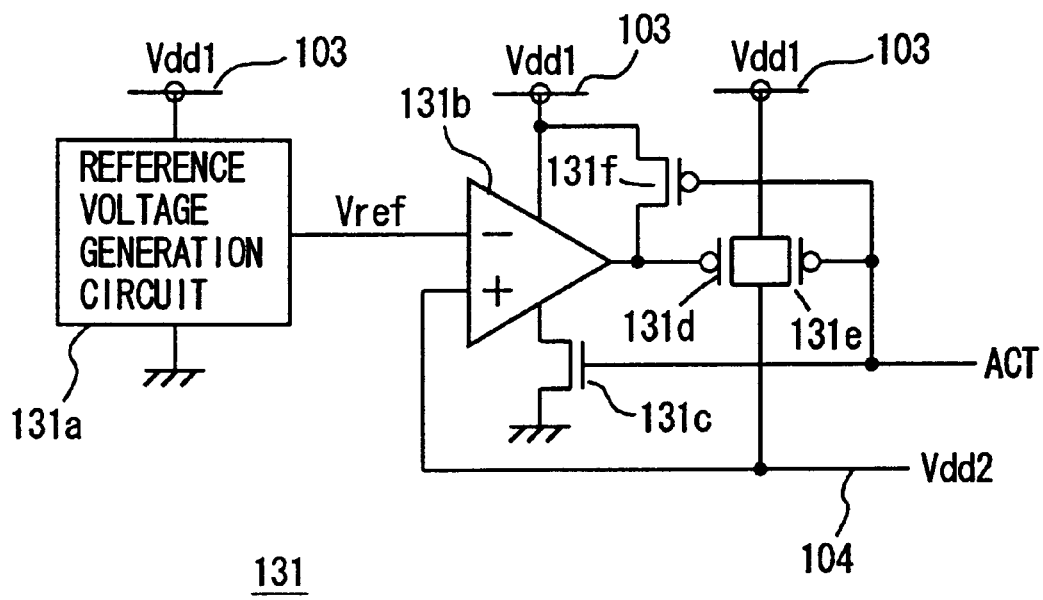
FIG. 11 is a diagram showing an example of a construction of a DC-DC converter shown in FIG. 10.

FIG. 11 is a diagram showing an example of the construction of DC-DC converter 131. When activated, DC-DC converter 131, shown in FIG. 11, down-converts power supply voltage Vdd2 for the second circuit group 102.

In FIG. 11, DC-DC converter 131 includes: a reference voltage generation circuit 131a for generating a constant reference voltage Vref from power supply voltage Vdd on power supply node 103; a comparison circuit 131b for comparing power supply voltage Vdd2 on power supply node 104 with reference voltage Vref when activated; an activation transistor 131c for activating comparator 131b upon activation of an activation control signal ACT; a current driving transistor 131d for supplying a current to power supply node 104 from power supply node 103 in accordance with an output signal of comparison circuit 131b; a P-channel MOS transistor 131e rendered conductive, upon activation of activation control signal ACT (at the time of the Low level), for electrically connecting power supply nodes 103 and 104; and a resetting P-channel MOS transistor 13 if rendered conductive, at the time of inactivation of activation control signal ACT, for electrically connecting power supply node 103 and the output node of comparison circuit 131b.

With respect to reference voltage Vref generated by reference voltage generation circuit 131a, its voltage level is adjustable, but is set to a voltage level not higher than power supply voltage Vdd1. When activation control signal ACT is at a Low level or in the non-activation state, MOS transistors 131e and 131f are rendered conductive, to set current drive transistor 131d to the off-state and to electrically connect power supply nodes 103 and 104, that power supply voltage Vdd2 becomes equal in voltage level to power supply voltage Vdd1. This state corresponds to a state with no racing, and is a default state.

When activation control signal ACT goes high, both of MOS transistors 131d and 131f enter the non-conductive state, while activation MOS transistor 131c is rendered conductive to activate comparison circuit 131b. In this state, comparison circuit 131b outputs a signal corresponding to a difference in voltage level between power supply voltage Vdd2 and reference voltage Vref, to drive current driving transistor 131d. In the case where the voltage level of power supply voltage Vdd2 is higher than reference voltage Vref, the output signal of comparison circuit 131b goes high, to set current driving transistor 131d to the non-conductive state. In contrast, in the case where power supply voltage Vdd2 is lower than reference voltage Vref, the output signal of comparison circuit 131b is set to a low level corresponding to the difference, and the conductance of current driving transistor 131d becomes greater, to supply a current from power supply node 103 to power supply node 104 in accordance with the output of the comparison circuit 131b. Therefore, power supply voltage Vdd2 is set to the voltage level of reference voltage Vref.

The so-called internal voltage down converting 1 circuit as shown in FIG. 11 is utilized as DC-DC converter 131, so that it becomes possible to implement an on-chip DC-DC converter. Moreover, it is possible to set power supply voltage Vdd2 accurately to a desired voltage level. By making the reference voltage generated by reference voltage generation circuit 131a variable, it becomes possible to optimize the operation speed of the second circuit group 102.

Here, DC-DC converter 131 may be constituted by the aforementioned charge pump circuit or the like, so as to be able to generate a voltage higher or lower than the input voltage (generate a boosted voltage or a negative voltage). Therefore, with respect to the aforementioned voltages Vdd, GND, Vdd1, Vdd2, Vss1, Vss2, Vpp1, Vpp2, Vbb1 and Vbb2 in the second to seventh embodiments, this DC-DC converter is applicable between corresponding two power supplies generating the both operating power source voltages. Moreover, a plurality of different power supply voltages may be generated from one power supply, so that the same effects as those of the second to seventh embodiments are achieved with fewer external power supplies.

As described above, in accordance with the eighth embodiment of the present invention, a DC-DC converter is adopted so that one power supply can generate other power supply voltages whose voltage levels are settable, and thus, it is possible to optimize operation conditions with fewer power supplies.

Here, activation control signal ACT shown in FIG. 11 may be generated by fixing a voltage of a specific bonding pad, or may be generated from a control signal generation circuit in accordance with a combination of specific signals.

[Ninth Embodiment]

Figure 12:
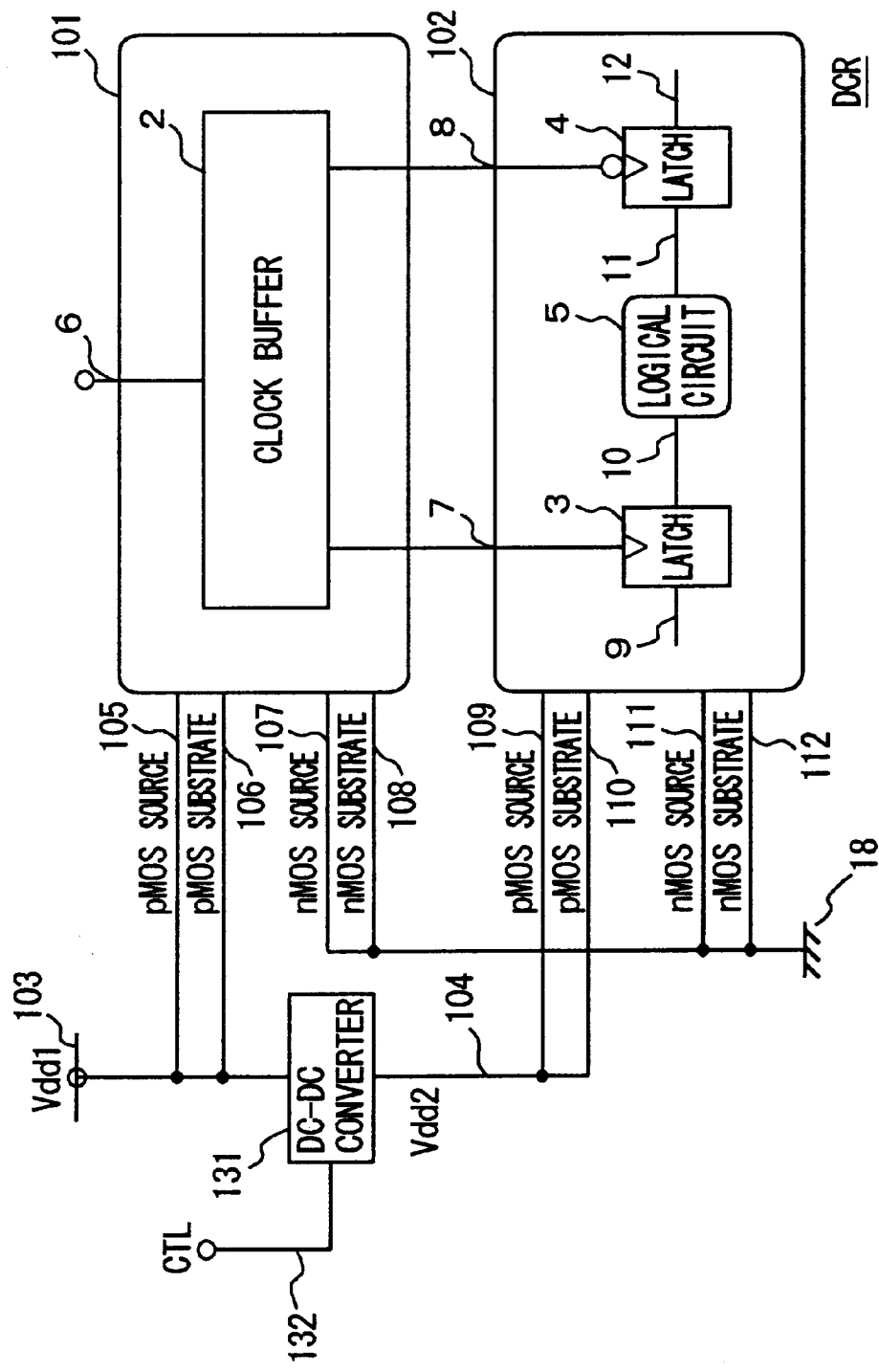
FIG. 12 is a schematic diagram showing the entire construction of a semiconductor integrated circuit device in accordance with a ninth embodiment of the present invention.

FIG. 12 is a schematic diagram showing the entire construction of a semiconductor integrated circuit device in accordance with the ninth embodiment of the present invention. In the construction shown in FIG. 12, a DC-DC converter 131 has its power supply voltage Vdd2 to be generated adjusted in voltage level in accordance with a control signal CTL that is supplied externally through a control terminal 132. Other constructions are the same as those shown in FIG. 10 and therefore, the corresponding parts are indicated by the same reference numerals and the description thereof is omitted.

In this DC-DC converter 131, the voltage level of power supply voltage Vdd2 to be generated is changed in accordance with control signal CTL.

Therefore, in the event of a racing for example, control signal CTL is changed to lower the voltage level of high level power supply voltage Vdd2 on power supply node 104 for the second circuit group 102 successively lowered from the original power supply voltage Vdd1. The voltage level of the power supply voltage Vdd2 is set to a voltage produced at the time when a racing is eliminated. Therefore, the same effects as those of the construction shown in FIG. 10 are provided, and the controlability from outside can be improved and thus, it is possible to eliminate an erroneous operation due to a racing without slowing down the operation speed of the second circuit group 102 unnecessarily.

Here, as for the arrangement for changing the level of the voltage generated by DC-DC converter 131 in accordance with control signal CTL, the following-arrangements may be utilized, for example: In the construction shown in FIG. 11, reference voltage Vref generated by reference voltage generation circuit 131a is successively altered in accordance with control signal CTL. In this case, when the reference voltage generation circuit is formed through current/voltage conversion, the resistance value used for voltage/voltage conversion is successively altered in accordance with control signal CTL. This is implemented by selectively altering the number of resistance elements that are series-connected in a series body of current/voltage conversion resistance elements, in accordance with control signal CTL. This arrangement is easily implemented by, for example, placing switching elements in parallel with resistance elements and selectively setting the switching elements to the conductive/non-conductive state in accordance with the control signal CTL. Therefore, in this case, for control signal CTL, a digital signal having a plurality of bits may be used. Alternatively, control signal CTL may be decoded so as to generate this resistance adjusting signal internally. Here, control signal CTL may be a signal of one bit.

In the case where a general DC-DC converter formed of switching elements and an inductance is utilized, the level of the voltage to be generated can be adjusted by adjusting the tap position of the inductance.

[Modified Example]

Figure 13:
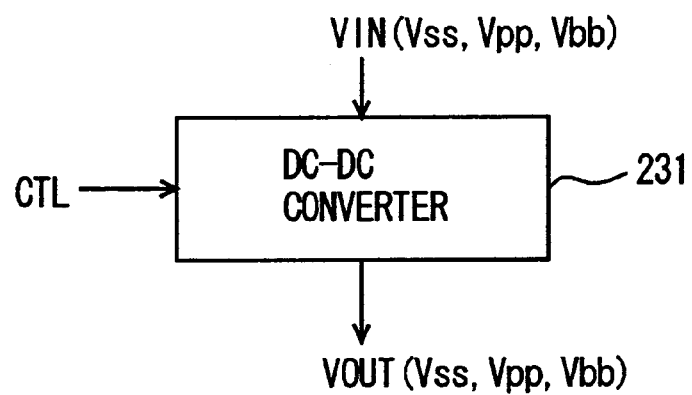
FIG. 13 is a schematic diagram showing a main portion of a modification of the ninth embodiment of the present invention.

FIG. 13 is a schematic diagram showing a modification of the ninth embodiment of the present invention. In FIG. 13, when activated, DC-DC converter 231 level-converts an input voltage VIN, and generates an output voltage VOUT. The voltage level of output voltage VOUT is set in accordance with control signal CTL. As input voltage VIN, any of low level power supply voltage Vss, P back gate voltage Vpp and N back gate voltage Vbb may be used, and level conversions may be carried out individually with respect to all these voltages. Therefore, in this case, by constructing DC-DC converter 231 so as to cope with any of the cases for raising and lowering the voltage level in accordance with control signal CTL, it is possible to set the operation speeds of the first circuit group 101 and the second circuit group 102 more finely under an external control.

Here, in the arrangement of DC-DC converter 231, in case of generating boosted voltage Vpp or negative voltage Vbb, a following configuration may be employed: a single charge pump circuit is used to generate a plurality of voltage levels of boosted voltages or negative voltages, and one of boosted voltages (or negative voltages) is selected in accordance with a selection signal corresponding to control signal CTL, thereby generating back gate voltages Vpp1 and Vpp2 (or Vbb1 and Vbb2).

As described above, in accordance with the ninth embodiment of the present invention, the output voltage level of the DC-DC converter for generating a voltage for the second circuit group is made changeable in accordance with the control signal. Thus, it is possible to optimize the operation speed of the second circuit group in response to the state of a racing through an external operation.

[Tenth Embodiment]

Figure 14:
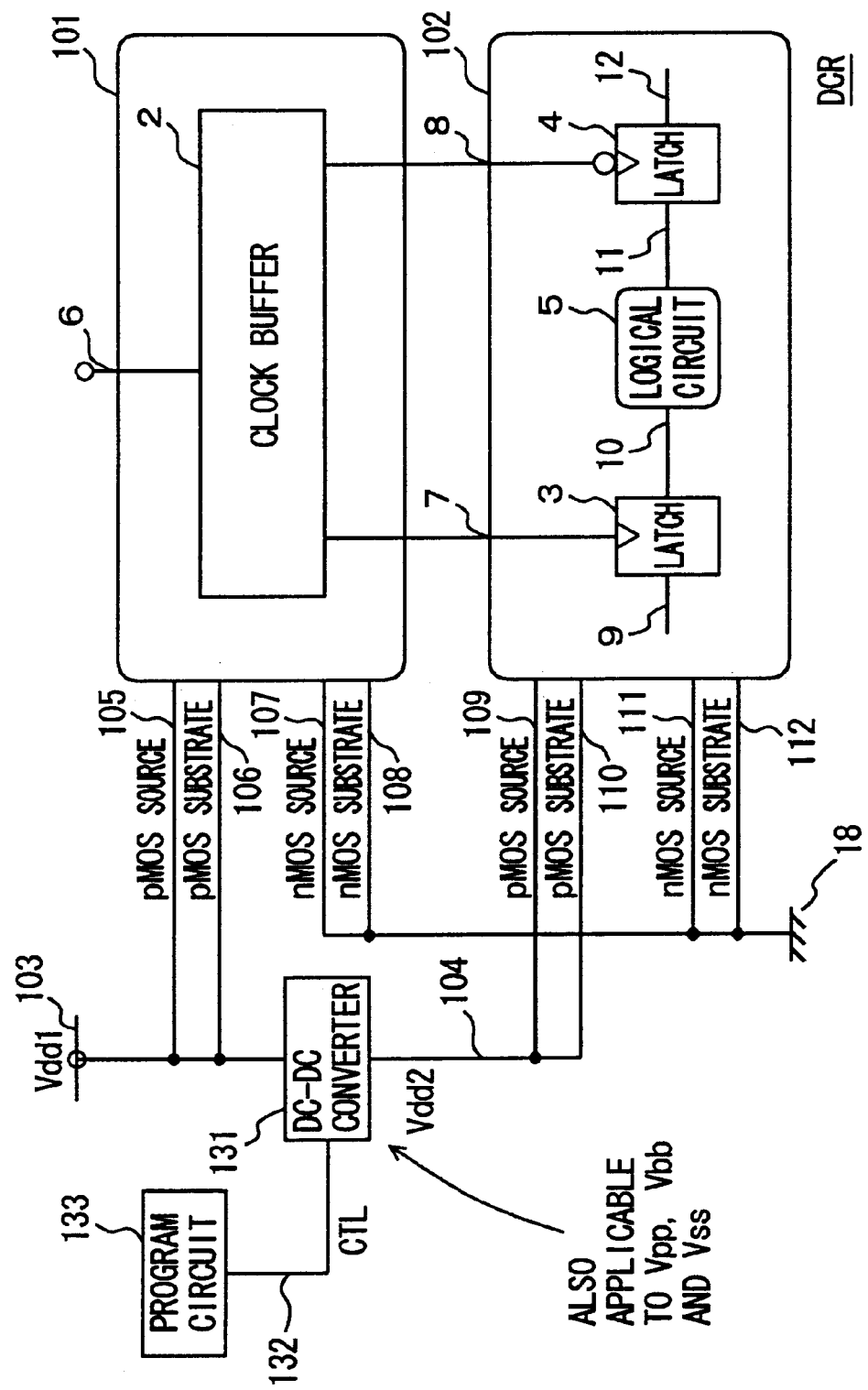
FIG. 14 is a schematic diagram showing the entire construction of a semiconductor integrated circuit device in accordance with a tenth embodiment of the present invention.

FIG. 14 is a schematic diagram showing the construction of a semiconductor integrated circuit device in accordance with the tenth embodiment of the present invention. In the construction shown in FIG. 14, control signal CTL to DC-DC converter 131 is generated from a program circuit 133. The other arrangements are the same as those shown in FIG. 12, and therefore, the corresponding parts are indicated by the same reference numerals, and the description thereof is omitted.

This program circuit 133 is formed by, for example, a fuse program circuit or a read only memory (ROM).

Program circuit 133 is so programmed that, in the event of an erroneous operation due to a racing, a control signal is generated so as to provide power supply voltage Vdd2 at a voltage level for eliminating the racing as control signal CTL to be applied to control node 132. In other words, in the case where a racing occurs in a test step, for example, programming of program circuit 133 is performed so as to generate the voltage Vdd2 at a voltage level that can eliminate the problem of the racing. In this case, the following procedure may be employed: in the program circuit, control signal data corresponding to a plurality of voltage levels are stored in advance; and a control signal to be read from the program circuit 133 is programmed in a fixed manner so as to read control signal data coping with the racing in a test step (for example, a corresponding address is fixed). Alternatively, data of one appropriate control signal may be programmed in accordance with the result of testing.

Program circuit 133 stores the programmed data semi-permanently. Therefore, after the programming of program circuit 133, control signal CTL is always applied to DC-DC converter 131 to adjust the voltage level of power supply voltage Vdd2 when operated, so that an erroneous operation due to the racing can be eliminated. With this arrangement, even any semiconductor integrated circuit that become defective due to a racing can be repaired by the programming of program circuit 133.

Here, in the construction shown in FIG. 14 also, DC-DC converter 131 is constructed so as to generate any of voltages higher and lower than the input voltage (see FIG.

13). Thus, it becomes possible to apply the construction shown in FIG. 14 in the same manner for the back gate voltage for adjusting the threshold voltage as well as for the low level power supply voltage. Control signal data can be programmed for the respective voltages.

As described above, in accordance with the tenth embodiment of the present invention, control signals for DC-DC converter 131 are programmed in a program circuit so that it is possible to repair any semiconductor integrated circuit that causes a failure due to a racing, through the programming.

Moreover, by programming information used for repairing such a failure in program circuit 133, it is not necessary to provide a terminal for inputting the control signal separately, resulting in reduced chip area.

[Eleventh Embodiment]

Figure 15:
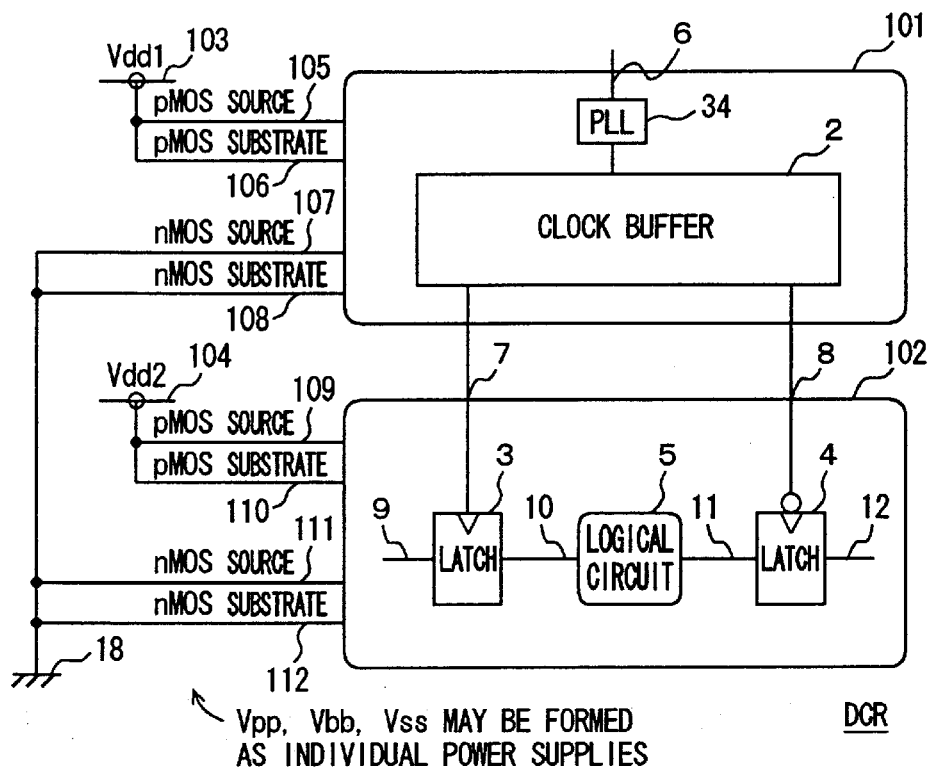
FIG. 15 is a schematic diagram showing the entire construction of a semiconductor integrated circuit device in accordance with an eleventh embodiment of the present invention.

FIG. 15 is a schematic diagram showing the entire construction of a semiconductor integrated circuit device in accordance with the eleventh embodiment of the present invention. In the construction of the semiconductor integrated circuit shown in FIG. 15, in the first circuit group 101, there is provided a PLL circuit 34 for making constant a phase difference between the clock signal from clock input node 6 and the internal clock signal outputted by clock buffer 2. A clock signal, outputted from PLL circuit 34, is applied to clock buffer 2, and then successively transmitted, and the resultant internal clock signals are distributed to the respective latch circuits in the second circuit group 102. The other arrangements are the same as those shown in FIG. 1, and therefore, the corresponding parts are indicated by the same reference numerals, and the description thereof is omitted.

In the first circuit group 101, PLL circuit 34 is provided, and operation power supply voltage Vdd1 for dock buffer 2 and PLL circuit 34 are commonly modified. In this case, the clock signal amplitude of PLL circuit 34 is the same as the amplitude of the output clock signal of clock buffer 2, and therefore it is not necessary to level-convert the output clock signal of PLL circuit 34 for application to clock buffer 2.

In this construction in which PLL circuit 34 is provided in the first circuit group 101 also, in the case where an erroneous operation occurs due to a racing, the operation speeds of the first circuit group 101 and second circuit group 102 are adjusted by adjusting the voltage levels of power supply voltages Vdd1 and Vdd2 such that the erroneous operation due to the racing is eliminated.

Here, in the construction shown in FIG. 15 also, instead of power supply voltages Vdd1 and Vdd2, as described in the aforementioned second to seventh embodiments, individual power supplies for back gate voltage Vbb and low level power supply voltage Vss may be provided for each of the first circuit group 101 and the second circuit group 102.

Moreover, as described in the aforementioned eighth to tenth embodiments, a single power supply construction may be employed by using a DC-DC converter.

As described above, in accordance with the eleventh embodiment of the present invention, a power supply is commonly provided for the PLL circuit and the clock buffer for clock distribution, so that the signal amplitudes of PLL circuit 30 and clock buffer 2 can be made equal, and therefore, it is not necessary to provide a level conversion circuit for matching the amplitude of the clock signal. Moreover, the operation characteristics of PLL circuit 30 and clock buffer 2 are altered in the same manner so that the phase locking of the PLL circuit can be established at high speed (in the case when the operation characteristics of clock buffer 2 and PLL circuit 30 are individually modified, the phase adjusting operation in the PLL circuit is subject to a great offset in the dock buffer, resulting in a long time to establish the phase locking).

[Twelfth Embodiment]

Figure 16:
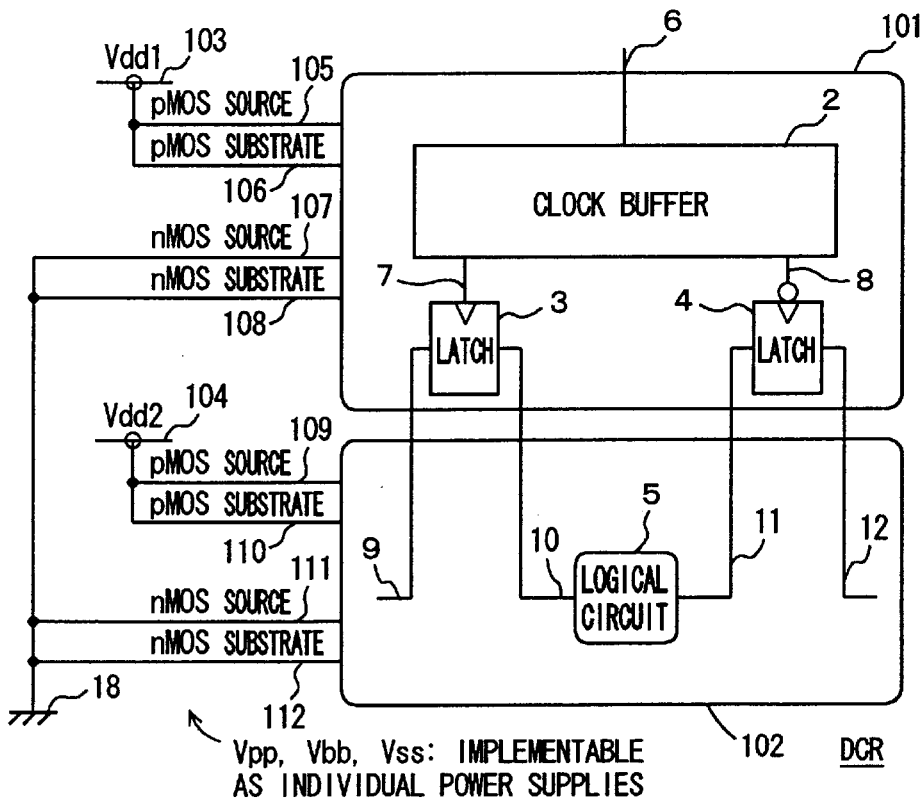
FIG. 16 is a schematic diagram showing the entire construction of a semiconductor integrated circuit device in accordance with a twelfth embodiment of the present invention.

FIG. 16 is a schematic diagram showing the entire construction of a semiconductor integrated circuit device in accordance with the twelfth embodiment of the present invention. In the construction shown in FIG. 16, latch circuits 3 and 4 are disposed in the first circuit group 101, and in the second circuit group 102, a logical circuit 5 is disposed. The other arrangements are the same as those of FIG. 1, and therefore, the corresponding parts are indicated by the same reference numerals, and the description thereof is omitted.

In the construction shown in FIG. 16, power supply voltage Vdd1 of the first circuit group 101 and power supply voltage Vdd2 of the second circuit group 102 can be individually set. Latch circuits 3 and 4 are operated synchronously with the clock signal from clock buffer 2. In this case, although the output signal amplitude of the latch circuit 3 is different from the amplitude of the processing signal of logical circuit 5, no problem arises in the actual operation, if the output signal amplitude of the latch circuit 3 is greater than the processing signal amplitude of logical circuit 5.

Therefore, by setting power supply voltage Vdd2 on power supply node 104 lower than power supply voltage Vdd1 of power supply node 103 for example, only the operation speed of logical circuit 5 can be reduced, and thus, it is possible to prevent an erroneous operation due to a racing in the same manner. Since the operation speeds of latch circuits 3 and 4 are not changed, the signal transferring between pipeline stages can be carried out at high speed.

In the case of the construction shown in FIG. 16, since the second circuit group 102 only includes a logical circuit, it is possible to reduce the circuit scale of the second circuit group 102. Moreover, since the internal circuit is divided into a circuit group for processing the clock signal and a circuit group for carrying out a logical process on applied signals, it is possible to easily separate the circuits for distributing power supplies.

Here, in the construction shown in FIG. 16 also, the constructions of the aforementioned second to eleventh embodiments may be used for individual voltage adjustment.

[Modification]

Figure 17:
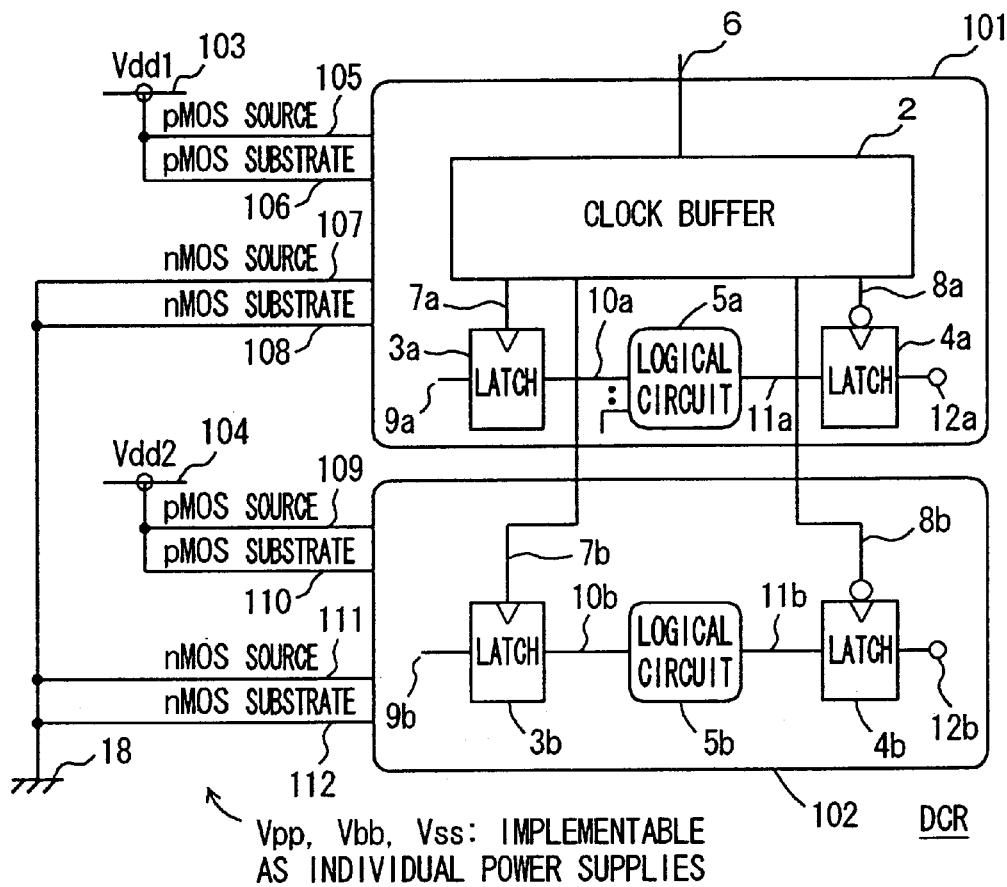
FIG. 17 is a schematic diagram showing a construction of a modification of the twelfth embodiment of the present invention.

FIG. 17 is a schematic diagram showing a modification of the twelfth embodiment of the present invention. In FIG. 17, in the first circuit group 101, latch circuits 3a and 4a and a logical circuit 5a are provided. Latch circuits 3a and 4a are complementarily set to the through/latch state synchronized with the respective internal clock signals on clock nodes 7a and 8a of clock buffer 2. Logical circuit 5a carries out a predetermined logical process on output signals from latch circuit 3a and another latch circuit, not shown, and outputs the resultant signal representing the result of the processing on a data node 11a connected to latch circuit 4a.

In the second circuit group 102, in the same manner, there are provided latch circuits 3b and 4b, which are complementarily set to the through/latch state synchronized with clock signals of clock nodes 7a and 8b receiving clock signals from clock buffer 2, and a logical circuit 5b, which carries out a logical process on a signal on a data node 10b, sent through latch circuit 3b, and outputs the resultant signal to a data node 11b.

Latch circuit 3b transfers a signal on data node 9b to data node 10b synchronized with a clock signal on clock node 7b. Latch circuit 4b transfers an output signal on a data node 11b to data node 12b synchronized with a clock signal on clock node 8b.

Internal clock signals are transmitted from clock buffer 2 to these latch circuits 3a, 4a, 3b and 4b through the corresponding clock nodes. In the case where logical circuit 5a is a multiple-input logical circuit, and logical circuit 5b is constituted by an inverter circuit, logical circuit 5a is greater in signal propagation delay, and logical circuit 5b is smaller in signal propagation delay. Therefore, in the case where the clock skew exists in these latch circuits 3a, 3b, 4a and 4b, for example, and where a path through logical circuit 5a forms a critical path for a racing due to the clock skew, power supply voltage Vdd2 for latch circuit 3b, logical circuit 5b and latch circuit 4b is set lower to reduce the operation speed thereof. Logical circuit 5a has a comparatively long propagation delay time. Even when operated in the same operation speed as that of clock buffer 2 by receiving the same power supply voltage Vdd1 as clock buffer 2, the logic circuit 5a causes a propagation delay greater than the clock skew, with the result that no problem of the racing arises.

As shown in the construction in FIG. 17, the latch circuits and logical circuits are classified into the first circuit group 101 and second circuit group 102 in accordance with actual propagation delays in the stages of the respective latch circuits and logical circuits. Thus, the operation speed of the critical path for the racing is adjusted to enable to prevent an erroneous operation due to a racing without reducing the operation speed unnecessary.

Here, the other arrangements shown in FIG. 17 are the same as those shown in FIG. 16, and therefore, in the construction shown in FIG. 17, for back gate voltages Vpp and Vbb and low level power supply voltage Vss, an arrangement for individually setting the respective voltages may be adopted.

Moreover, in the constructions shown in FIGS. 16 and 17, the PLL circuit may be placed in the first circuit group 101.

Furthermore, in place of the PLL circuit, a DLL (Delayed Locked Loop) circuit may be used.

As described above, in accordance with the twelfth embodiment of the present invention, the latch circuits and logical circuits are classified into the first and second circuit group so that it is possible to easily separate circuits for distributing power supplies. In addition, the operation speeds of the circuit groups are adjusted in accordance with actual operation states of the circuits, and thus, it becomes possible to eliminate the problem of racing without reducing the operation speed more than necessary.

As described above, in accordance with the present invention, power supply voltages/back gate voltages, applied to the circuit for generating a clock and the logical circuit for carrying out a logical process on a signal transferred in response to the clock signal, can be individually set. Thus, it becomes possible to easily eliminate an erroneous operation due to a racing in a semiconductor integrated circuit through an external operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor integrated circuit comprising:
  clock distribution circuitry receiving a first operation voltage and operating at an operation speed thereof determined by the received first operation voltage for distributing a dock signal, said dock distribution circuit including insulated gate type transistors receiving said first operation voltage at respective first conduction nodes;
  a plurality of latch circuits for transferring received signals in accordance with clock signals from said dock distribution circuitry; and
  at least one logical circuit placed corresponding to said plurality of latch circuits, for carrying out a logical process on a signal from a corresponding latch circuit to output a resultant signal, said logical circuit including insulated gate transistors of a same conductivity type as the insulated gate transistors of said clock distribution circuitry receiving a second operation voltage at respective first conduction nodes, the logic circuit having an operation speed determined in accordance with the second operational voltage, and the first and second operation voltages having voltage levels settable individually.

2. The semiconductor integrated circuit according to claim 1, wherein said plurality of latch circuits receive the first operation voltage and have operation speeds thereof determined by the received first operation voltage.

3. The semiconductor integrated circuit according to claim 1, wherein said plurality of latch circuits receive the second operation voltage and have operation speeds thereof determined by the received second operation voltage.

4. The semiconductor integrated circuit according to claim 1, wherein said plurality of latch circuits comprise a first latch circuit receiving the first operation voltage and having an operation speed thereof determined by the received first operation voltage and a second latch circuit receiving the second operation voltage and having an operation speed thereof determined by the received second operational voltage.

5. The semiconductor integrated circuit according to claim 1, wherein said first operation voltage is an operation power supply voltage corresponding to a first logical level for said dock distribution circuitry, and said second operation voltage is an operation power supply voltage corresponding to the first logical level for the logical circuit.

6. The semiconductor integrated circuit according to claim 5, wherein said first logical level is a logical high level.

7. The semiconductor integrated circuit according to claim 5, wherein said first logical level is a logical low level.

8. The semiconductor integrated circuit according to claim 1, wherein said first operation voltage comprises operation power supply voltages at first and second logical levels, respectively, and said second operation voltage comprises operation power supply voltages at the first and second logical levels, respectively; and
  the insulated gate transistors of said clock distribution circuitry comprise a first insulated gate transistor of a first conductivity type receiving the operation power supply voltage of the first logic level of the first operation voltage at the first conduction node thereof, and a second insulated gate transistor of a second conductivity type receiving the power supply voltage of the second logic level at the first conduction node thereof; and
  the insulated gate transistor of the logic circuit comprises a third insulated gate transistor of the power supply voltage of the first logic level of the second operation voltage at the first conduction node thereof, and a fourth insulated gate transistor of the second conductivity type receiving the power supply voltage of the second logic level of the second operation voltage at the first conduction node thereof.

9. The semiconductor integrated circuit according to claim 1, wherein said clock distribution circuitry comprises a phase adjusting circuit for synchronizing phases of a basic clock signal and the clock signal to be distributed to the latch circuits.

10. The semiconductor integrated circuit according to claim 1, further comprising a voltage conversion circuit for converting the first operation voltage and generating the second operation voltage.

11. The semiconductor integrated circuit according to claim 10, wherein said voltage conversion circuit has a level of the voltage to be generated programmable.

12. The semiconductor integrated circuit according to claim 10, wherein said voltage conversion circuit is selectively activated in accordance with a control signal, and carries out a level converting operation to generate said second operation voltage at a voltage level different from said first operation voltage when activated.

13. A semiconductor integrated circuit comprising:
clock distribution circuitry including insulated gate type transistors having back gates receiving a first operation voltage, for distributing a clock signal;
a plurality of latch circuits for transferring received signals in accordance with clock signals from said clock distribution circuitry; and
at least one logical circuit placed corresponding to said plurality of latch circuits, for carrying out a logical process on a signal from a corresponding latch circuit to output a resultant signal, said logical circuit including insulated gate transistors, of a same conductivity type as the insulated gate transistors of the clock distribution circuit, having back gates receiving a second operation voltage, the first and second operation voltages having their voltage levels settable individually.

14. The semiconductor integrated circuit according to claim 13, wherein said clock distribution circuitry and said at least one logical circuit each comprise first insulated gate type field effect transistors of a first conductivity type and second insulated gate type transistors of a second conductivity type, as components thereof,
said first operation voltage includes first and second back gate voltages to be applied to the back gates of the first and second insulated gate type transistors in said clock distribution circuitry, and
said second operation voltage include third and fourth back gate voltages to be applied to the back gates of the first and second insulated gate type transistors in said logical circuit.

15. The semiconductor integrated circuit according to claim 13, wherein said dock distribution circuitry, said at least one latch circuit and said logical circuit each receive a common operation power supply voltage.

16. The semiconductor integrated circuit according to claim 13, wherein the latch circuits receives a common operation voltage with said at least one logical circuit.

17. The semiconductor integrated circuit according to claim 10, wherein said clock distribution circuitry comprises a phase adjusting circuit for synchronizing phases of a basic clock signal and the clock signal to be distributed to the latch circuits.

18. The semiconductor integrated circuit according to claim 13, further comprising a voltage conversion circuit for converting the first operation voltage and generating the second operation voltage.

19. The semiconductor integrated circuit according to claim 18, wherein said voltage conversion circuit has a level of the voltage to be generated programmable.

20. The semiconductor integrated circuit according to claim 18, wherein said voltage conversion circuit is selectively activated in accordance with a control signal, and carries out a level converting operation to generate said second operation voltage at a voltage level different from said first operation voltage when activated.

21. A semiconductor integrated circuit comprising:
clock distribution circuitry for distributing a clock signal;
a plurality of transfer circuits operating in accordance with the clock signal from said clock distribution circuit, for transferring received signals in accordance with the clock signals distributed from the clock distribution circuitry;
at least one logical circuit arranged corresponding to said plurality of transfer circuits, for carrying out a logical process on a signal received from a corresponding transfer circuit to output a resultant signal; and
operation speed adjusting circuitry for individually adjusting operation speeds of said clock distribution circuitry and said at least one logical circuit.

22. The semiconductor integrated circuit according to claim 21, wherein said operation speed adjusting circuitry adjusts an operation speed of at least a part of the transfer circuits concurrently with said at least one logical circuit.

23. The semiconductor integrated circuit according to claim 21, wherein said operation speed adjusting circuitry adjusts an operation speed of at least a part of the transfer circuits concurrently with said clock distribution circuitry.

24. A semiconductor integrated circuit comprising:
clock distribution circuitry receiving a first operation voltage, for distributing a clock signal, said clock distributing circuitry having an operation speed determined in accordance with the first operation voltage;
a plurality of latch circuits for transferring received signals in accordance with clock signals from said clock distribution circuitry; and
at least one logical circuit placed corresponding to said plurality of latch circuits and receiving a second operation voltage other than the first operation voltage and having an operation speed thereof determined in accordance with the second operation voltage, for carrying out a logical process on a signal from a corresponding latch circuit to output a resultant signal, the first and second operation voltages having their voltage levels settable individually and being applied to said clock distribution circuitry and said logic circuit separately and dedicatedly.

* * * * *